US011776197B2

United States Patent
Liu

(10) Patent No.: US 11,776,197 B2
(45) Date of Patent: Oct. 3, 2023

(54) METHOD AND APPARATUS FOR DISPLAYING PERSONALIZED FACE OF THREE-DIMENSIONAL CHARACTER, DEVICE, AND STORAGE MEDIUM

(71) Applicant: Tencent Technology (Shenzhen) Company Limited, Shenzhen (CN)

(72) Inventor: Mianguang Liu, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 110 days.

(21) Appl. No.: 17/345,584

(22) Filed: Jun. 11, 2021

(65) Prior Publication Data

US 2021/0312696 A1 Oct. 7, 2021

Related U.S. Application Data

(63) Continuation of application No. PCT/CN2020/088772, filed on May 6, 2020.

(30) Foreign Application Priority Data

May 17, 2019 (CN) .......................... 201910414362.8

(51) Int. Cl.
*G06T 15/04* (2011.01)
*G06T 15/20* (2011.01)
(Continued)

(52) U.S. Cl.
CPC ............ *G06T 15/04* (2013.01); *G06T 15/205* (2013.01); *G06T 17/00* (2013.01); *G06T 19/20* (2013.01); *G06T 2219/2012* (2013.01)

(58) Field of Classification Search
None
See application file for complete search history.

(56) References Cited

U.S. PATENT DOCUMENTS

2007/0273711 A1* 11/2007 Maffei .................... G06T 17/20
345/639
2008/0052242 A1* 2/2008 Merritt ................... G06F 21/10
705/51
(Continued)

FOREIGN PATENT DOCUMENTS

CN 107204036 A 9/2017
CN 109603151 A 4/2019
(Continued)

OTHER PUBLICATIONS

Sergio Ruiz, Benjamin Hernandez, Adriana Alvarado, Isaac Rudomin, "Reducing Memory Requirements for Diverse Animated Crowds", Nov. 9, 2013, ACM, Proceedings of Motion in Games 2013.*
Jonathan Maim, Barbara Yersin, Daniel Thalmann, "Unique Character Instances for Crowds", Nov. 2009, IEEE, IEEE Computer Graphics and Applications, vol. 29, No. 6, pp. 82-90.*
Tapio Terävä, "Workflows for Creating 3D Game Characters", Spring 2017, Kajaanin Ammattikorkeakoulu University of Applied Sciences, Thesis publication.*
(Continued)

*Primary Examiner* — Robert Bader
(74) *Attorney, Agent, or Firm* — Crowell & Moring LLP

(57) ABSTRACT

A method for displaying a personalized face of a three-dimensional (3D) character is provided, performed by a computer device, the method including: obtaining a texture identifier of a personalized face model of a 3D character, the texture identifier being used for identifying a target pattern texture of a target part on the personalized face model, the target part being configured with a corresponding UV texture image, the UV texture image comprising at least two candidate pattern textures of the target part; drawing a basic UV texture image on the personalized face model, the basic UV texture image comprising a texture of a region other than the target part; determining, according to the texture identifier, the target pattern texture from the at least two candidate pattern textures of the target part according to; and drawing the target pattern texture on a region corresponding to the target part on the personalized face model.

16 Claims, 11 Drawing Sheets

(51) Int. Cl.
*G06T 17/00* (2006.01)
*G06T 19/20* (2011.01)

(56) References Cited

U.S. PATENT DOCUMENTS

| | | | |
|---|---|---|---|
| 2013/0120425 A1* | 5/2013 | Kuwabara | G06T 15/04 345/582 |
| 2014/0078144 A1* | 3/2014 | Berriman | A63F 13/61 345/426 |
| 2016/0086387 A1 | 3/2016 | Os et al. | |
| 2019/0035149 A1 | 1/2019 | Chen et al. | |

FOREIGN PATENT DOCUMENTS

| | | | |
|---|---|---|---|
| CN | 109675315 A | 4/2019 | |
| CN | 110136236 A | 8/2019 | |

OTHER PUBLICATIONS

International Search Report and Written Opinion with English Translation for International Application No. PCT/CN2020/088772 dated Aug. 13, 2020; 12 pages.
Extended European Search Report for European Patent Application No. 20809104.1 dated Jun. 23, 2022, 12 pages.
Zeng Xiangyong et al: "A Video Based Personalized Face Model Generation Approach for Network 3D Games",Sep. 19, 2005 (Sep. 19, 2005), Advances in Biometrics: International Conference, ICB 2007, Seoul, Korea, Aug. 27-29, 2007; Proceedings; [Lecture Notes in Computer Science; Lect.Notes Computer], Springer, Berlin, Heidelberg, pp. 230-238.
Anonymous: "UV mapping—Wikipedia", Nov. 30, 2018 (Nov. 30, 2018), pp. 1-3, XP055929487, Retrieved from the Internet: URL:https://en.wikipedia.org/w/index.php?title=UV_mapping&oldid=871387795 [retrieved on Jun. 9, 2022].

* cited by examiner

METHOD AND APPARATUS FOR DISPLAYING PERSONALIZED FACE OF THREE-DIMENSIONAL CHARACTER, DEVICE, AND STORAGE MEDIUM

RELATED APPLICATION

This application is a continuation application of the International PCT Application No. PCT/CN2020/088772, filed with the China National Intellectual Property Administration, PRC on May 6, 2020 which claims priority to Chinese Patent Application No. 201910414362.8, filed with the China National Intellectual Property Administration, PRC on May 17, 2019, each of which is incorporated herein by reference in their entireties.

FIELD OF THE TECHNOLOGY

This application relates to the field of virtual modeling, and in particular, to a method and an apparatus, a device, and a storage medium for displaying a personalized face of a three-dimensional (3D) character.

BACKGROUND OF THE DISCLOSURE

A function for a game user to customize a face of a 3D character in a personalized way is provided in a 3D online game. The face of the 3D character includes a 3D face model and a texture image overlaid on the 3D face model. The personalized customization allows a user to customize the texture image.

In a personalized customization method in the related art, a total of three replaceable facial feature parts: an eye, a mouth, and an eyebrow are provided, and three candidate patterns are provided for each of the facial feature parts. All combinations are drawn by an art designer in advance. That is, a total of 3*3*3=27 texture images need to be drawn.

When the replaceable facial feature parts or the candidate patterns increase, a quantity of texture images multiplies. For example, when a new candidate pattern is added for the mouth part, 1*3*3=9 texture images need to be added. This greatly increases the workload for an art designer to draw texture images, and there is a problem of high costs of implementing personalized customization of a face.

SUMMARY

Embodiments of this disclosure provide a method and an apparatus for displaying a personalized face of a 3D character, a device, and a storage medium. A method for displaying a personalized face of a 3D character is provided, performed by a computer device, the method including:
  obtaining a texture identifier of a personalized face model of a 3D character, the texture identifier being used for identifying a target pattern texture of a target part on the personalized face model, the target part being provide with a corresponding UV texture image, the UV texture image including at least two candidate pattern textures of the target part;
  drawing a basic UV texture image on the personalized face model, the basic UV texture image including a texture of a region other than the target part;
  determining the target pattern texture from the at least two candidate pattern textures corresponding to the target part according to the texture identifier; and
  drawing the target pattern texture on a region corresponding to the target part on the personalized face model.

An apparatus for displaying a personalized face of a 3D character is provided, the apparatus including:
  an obtaining module, configured to obtain a texture identifier of a personalized face model of a 3D character, the texture identifier being used for identifying a target pattern texture of a target part on the personalized face model, the target part being provide with a corresponding UV texture image, the UV texture image including at least two candidate pattern textures of the target part;
  a drawing module, configured to draw a basic UV texture image on the personalized face model, the basic UV texture image including a texture of a region other than the target part; and
  a determining module, configured to determine the target pattern texture from the at least two candidate pattern textures corresponding to the target part according to the texture identifier,
  the drawing module being further configured to draw the target pattern texture on a region corresponding to the target part on the personalized face model.

A computer device is provided, including a processor and a memory, the memory storing computer-readable instructions, the computer-readable instructions being loaded and executed by the processor to implement the operations of the method for displaying a personalized face of a 3D character.

A non-transitory computer-readable storage medium is provided, storing computer-readable instructions, the non-transitory computer-readable instructions being loaded and executed by a processor to implement the operations of the method for displaying a personalized face of a 3D character.

Details of one or more embodiments of this disclosure are provided in the accompanying drawings and descriptions below. Other features, objectives, and advantages of this application become apparent from the specification, the accompanying drawings, and the claims.

BRIEF DESCRIPTION OF THE DRAWINGS

To describe the technical solutions in the embodiments of this disclosure more clearly, the accompanying drawings required for describing the embodiments are briefly described hereinafter. Apparently, the accompanying drawings in the following description show merely some embodiments of this disclosure, and a person of ordinary skill in the art may obtain other accompanying drawings according to these accompanying drawings without creative efforts.

DESCRIPTION OF EMBODIMENTS

To make the objectives, technical solutions, and advantages of this application clearer, the following further describes implementations of this application in detail with reference to the accompanying drawings.

First, several terms used in the embodiments of this disclosure are briefly introduced.

A virtual environment is a virtual environment displayed (or provided, configured) when an application is run on a terminal. The virtual environment may be a simulated environment of the real world, or may be a semi-simulated semi-fictional 3D environment, or may be an entirely fictional 3D environment. The virtual environment may include any one of a two-dimensional virtual environment, a 2.5-dimensional virtual environment, and a 3D virtual environment. Descriptions are made by using an example in which the virtual environment is a 3D virtual environment in the following embodiment, but this is not limited. Optionally, the virtual environment is further used for a virtual environment interaction such as battle between at least two 3D characters.

A 3D character is a movable object in a virtual environment. The movable object may be at least one of a virtual person, a virtual animal, and an animation character. Optionally, in a case that the virtual environment is a 3D virtual environment, the 3D character is a 3D model created based on a skeletal animation technology. Each 3D character has a shape and a volume in the 3D virtual environment, and occupies some space in the 3D virtual environment.

A face model is a model of a face of a 3D character. The face model is provided with a drawn texture image, and different parts of the same face model may be configured with various candidate pattern textures.

UV coordinates are "u and v texture mapping coordinates" for short (similar to x, y, and z axes in a spatial model). The UV coordinates define position information of all points on a candidate pattern texture. These points are related to a 3D model and used for determining the position of the candidate pattern texture on the 3D model.

Unfolding UV is to display each vertex in a 3D model in a two-dimensional (2D) plane coordinate system in a one-to-one correspondence, to facilitate drawing of the 3D model in the 2D coordinate system.

Figure 1:
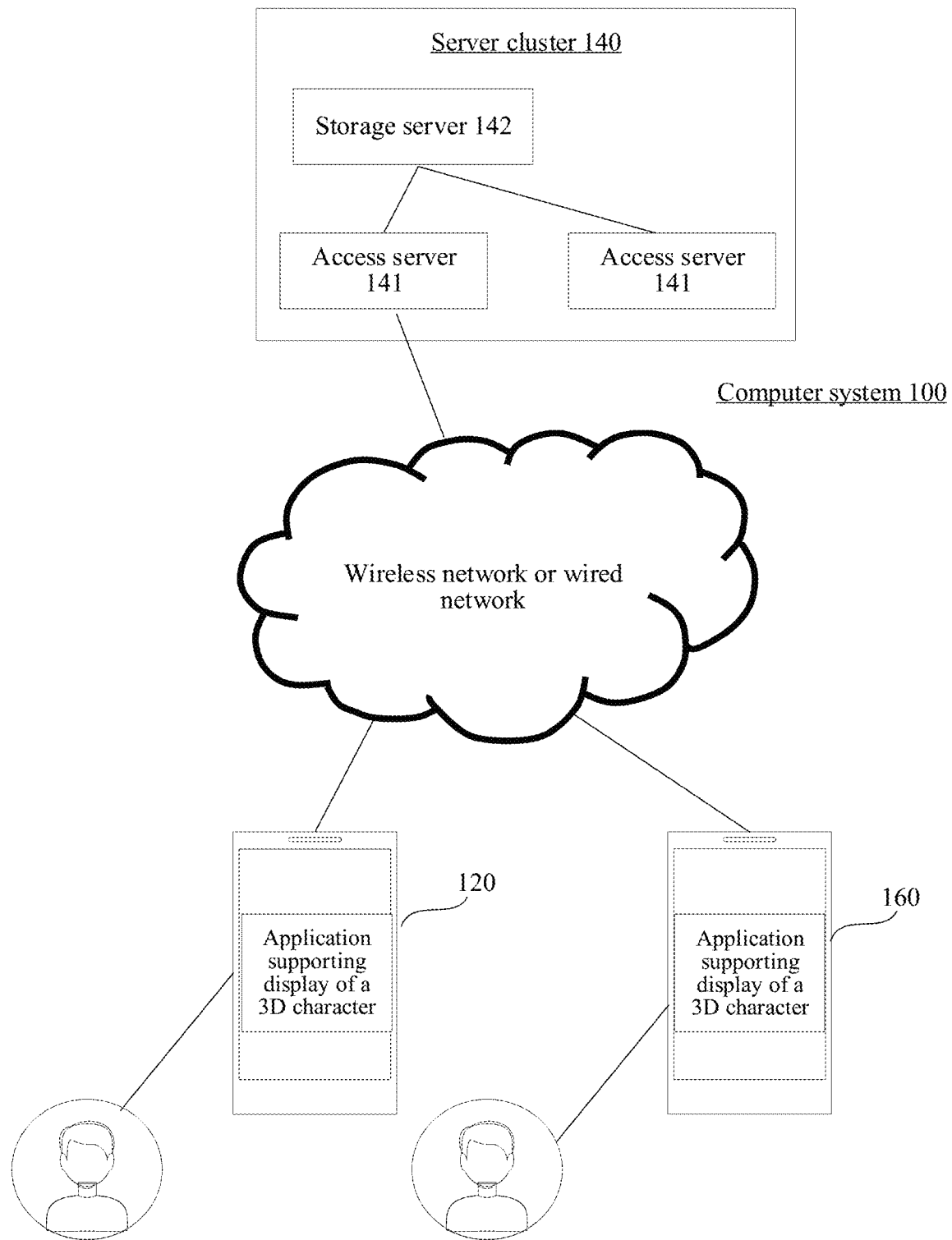
FIG. 1 is a diagram of an implementation environment of a method for displaying a personalized face of a 3D character according to an exemplary embodiment of this disclosure.

FIG. 1 is a structural block diagram of a computer system 100 according to some embodiments of this disclosure. The computer system 100 provides a sharing 3D virtual environment, and the 3D virtual environment includes a plurality of 3D characters. The computer system 100 includes a first terminal 120, a server cluster 140, and a second terminal 160.

The first terminal 120 is connected to the server cluster 140 by using a wireless network or wired network. The first terminal 120 may be at least one of a smartphone, a game console, a desktop computer, a tablet computer, an e-book reader, and a laptop portable computer. A first client is installed and run on the first terminal 120. The first client is provided with a 3D virtual environment, and the 3D virtual environment includes a plurality of 3D characters. As an example in this embodiment, the first client may be any one of a 3D game application, an image processing program, an avatar generation program, an expression management program, and a game program. Schematically, the first client is a client used by a first user, and a first user account is logged in to the first client. The first user account has a control permission of a first 3D character, and a face model of the first 3D character is allowed to be customized in a personalized way.

The first terminal 120 is connected to the server cluster 140 by using a wireless network or wired network.

The server cluster 140 includes at least one of one server, a plurality of servers, a cloud computing platform, and a virtualization center. The server cluster 140 is configured to provide a backend service for the first terminal 120 and the second terminal 160. Optionally, the server cluster 140 is responsible for primary computing work, and the first terminal 120 and the second terminal 160 are responsible for secondary computing work. Alternatively, the server cluster 140 is responsible for secondary computing work, and the first terminal 120 and the second terminal 160 are responsible for primary computing work. Alternatively, the server cluster 140, the first terminal 120, and the second terminal 160 perform collaborative computing by using a distributed computing architecture.

In some embodiments, the server cluster 140 includes an access server 141 and a storage server 142. The access server 141 is configured to provide an access service for the first terminal 120 and the second terminal 140. The storage server 142 is configured to receive a texture identifier of the first 3D character transmitted by the first terminal 120.

A second client is installed and runs on the second terminal 160. The application may be a 3D game application. The second terminal 160 is a client used by a second user. The second client is provided with a 3D virtual environment, and the 3D virtual environment includes a plurality of 3D characters. As an example of this embodiment of this disclosure, the second client may be a 3D game application. Schematically, the second client is a client used by the second user, and a second user account is logged in to the second client. The second user account has a control permission of a second 3D character, and a face model of the second 3D character is allowed to be customized in a personalized way.

The first terminal 120 may be generally one of a plurality of terminals, and the second terminal 160 may be generally one of a plurality of terminals. In this embodiment, only the first terminal 120 and the second terminal 160 are used as examples for description. Terminal types of the first terminal 120 and the second terminal 160 may be the same or different. The terminal type includes at least one of a smartphone, a game console, a desktop computer, a tablet computer, an ebook reader, an MP3 player, an MP4 player, or a laptop computer. The following embodiments are described by using an example in which at least one of the first terminal 120 and the second terminal 140 is a smartphone, and the first user account and the second user account are in the same 3D virtual environment.

A person skilled in the art may understand that, a quantity of the foregoing terminals (or clients) is not limited herein. For example, there may be only one terminal, or there may be dozens of or hundreds of or more terminals. In this case, the computer system further includes another terminal. A quantity and device types of other terminals are not limited in the embodiments of this disclosure.

Figure 2:
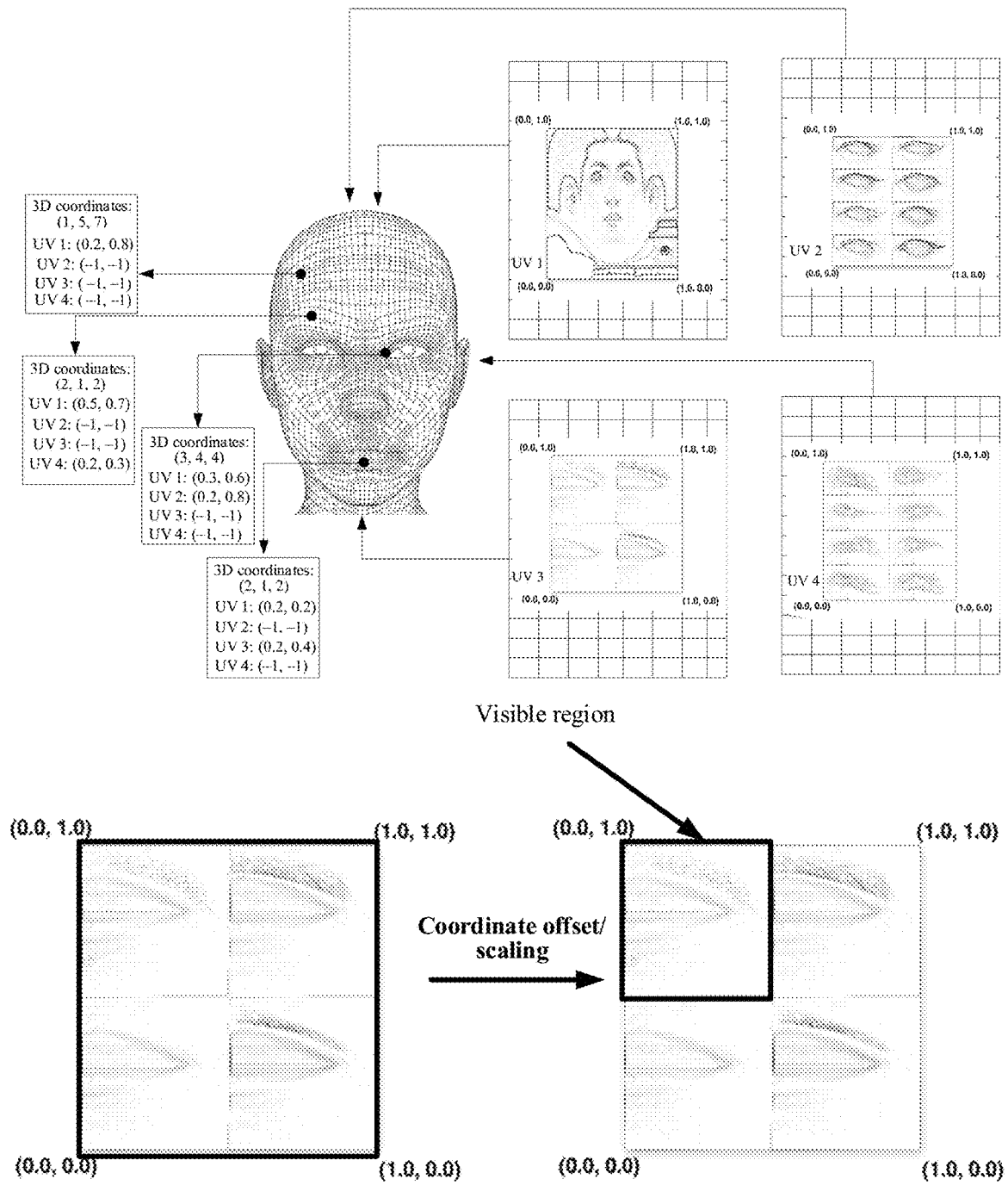
FIG. 2 is a schematic diagram of a method for displaying a personalized face of a 3D character according to an exemplary embodiment of this disclosure.

This application provides a solution of displaying a personalized face of a 3D character. FIG. 2 is a schematic diagram of the principle of a method for displaying a personalized face of a 3D character according to an exemplary embodiment.

A personalized face model includes a plurality of vertexes. Each vertex may correspond to a plurality of groups of coordinate information in different UV coordinate systems. Corresponding textures of each vertex in different UV coordinate systems are determined according to the coordinate information in the corresponding UV coordinate system. Target pattern textures in different UV coordinate systems are mapped to the face model in sequence according to the coordinate information of each vertex, to form a personalized face including a plurality of textures.

Schematically, with reference to FIG. 2, this solution is described by using an example in which a drawn personalized face includes three target parts: an eye, a mouth, and an eyebrow. The face model includes a plurality of vertexes. Representative vertexes are selected for different parts of the face model in FIG. 2. Positions of the vertexes on the face model include: a forehead, an eyebrow, an eye, and a mouth from top to bottom. The eyebrow, the eye, and the mouth are target parts. Regions including the forehead other than the target parts (or target regions corresponding to the target parts) are non-target parts. Textures of non-target parts are drawn in a UV coordinate system, and each target part is drawn in a UV coordinate system separately. Schematically, textures of the non-target parts (i.e., basic UV texture images) are drawn in a first UV coordinate system (UV1); a plurality of candidate pattern textures of the eye, which is a target part, are drawn in a second UV texture coordinate system (UV 2); a plurality of candidate pattern textures of the mouth, which is another target part, are drawn in a third UV texture coordinate system (UV 3); and a plurality of candidate pattern textures of the eyebrow, which is another target part, are drawn in a fourth UV texture coordinate system (UV 4).

Each vertex on the face model includes a plurality of groups of UV coordinate information. Schematically, with reference to FIG. 2, coordinate information included in a vertex at the forehead includes: The vertex with coordinates of (1, 5, 7) in the 3D coordinate system, coordinates of (0.2, 0.8) in the UV 1, coordinates of (−1, −1) in the UV 2, coordinates of (−1, −1) in the UV 3, and coordinates of (−1, −1) in the UV 4.

Coordinate information included in a vertex at the eye includes: The vertex with coordinates of (3, 4, 4) in the 3D coordinate system, coordinates of (0.3, 0.6) in the UV 1, coordinates of (0.2, 0.8) in the UV2, coordinates of (−1, −1) in the UV3, and coordinates of (−1, −1) in the UV4.

Coordinate information included in a vertex at the mouth includes: The vertex with coordinates of (2, 1, 2) in the 3D coordinate system, coordinates of (0.2, 0.2) in the UV 1, coordinates of (−1, −1) in the UV 2, coordinates of (0.2, 0.4) in the UV3, and coordinates of (−1, −1) in the UV4.

Coordinate information included in a vertex at the eyebrow includes: The vertex with coordinates of (2, 1, 2) in the 3D coordinate system, coordinates of (0.5, 0.7) in the UV 1, coordinates of (−1, −1) in the UV 2, coordinates of (−1, −1) in the UV 3, and coordinates of (0.2, 0.3) in the UV 4.

After receiving a texture identifier, the second client determines a target pattern texture according to the texture identifier, and draws the face model according to the coordinate information of the vertexes.

Schematically, the drawing process includes: The second client determines coordinate information of each vertex on the face model corresponding to UV 1, and maps all basic UV texture images in the UV 1 to the face model according to the coordinate information. Optionally, the basic UV texture images may or may not include texture information for the target parts. After all the basic UV texture images in the UV 1 are mapped to the face model, the second client respectively maps target pattern textures in the UV 2, UV 3, and UV 4 to the corresponding target parts of the face model in sequence. Because the target pattern textures are drawn only on the target parts of the face model, the order of drawing the target parts is not limited. Drawing of target pattern textures in the UV2, UV3, and UV4 may also be performed in parallel. When the basic UV texture images include textures of the target parts, it is necessary to draw the basic UV texture images first, and then draw the target pattern texture. If the basic UV texture images do not include the textures of the target parts, the UV 1, UV 2, UV 3, and UV 4 may be drawn in no particular sequence.

Because the target pattern texture of each target part is drawn separately in a UV coordinate system, during drawing of the corresponding target pattern texture in the coordinate system, coordinate information of the vertexes in the UV coordinate system outside the target part may be set to negative numbers. By doing so, the second client only needs to draw the target texture information on a region with positive coordinate information, to ensure that the target pattern texture is drawn on the target part.

Optionally, the texture identifier includes at least one of coordinate offset data or coordinate scaling data. With reference to FIG. 2, a visible region is included in a UV coordinate system in which the candidate pattern texture is located. The coordinate offset data is used for changing a start position of the visible region, and the coordinate scaling data is used for changing the size of a visible range. After the visible range is determined according to the texture identifier, the second client maps a target pattern texture in the visible range to the target part to switch a local texture of the face model. For example, when the application is developed based on a Unity engine, the start position of the visible range may be modified by modifying a parameter corresponding to "offset", and the size of the visible range may be modified by modifying a parameter corresponding to "liting".

The target part may include any part of the 3D character, and therefore, the target part is not limited to the aforementioned parts.

Figure 3:
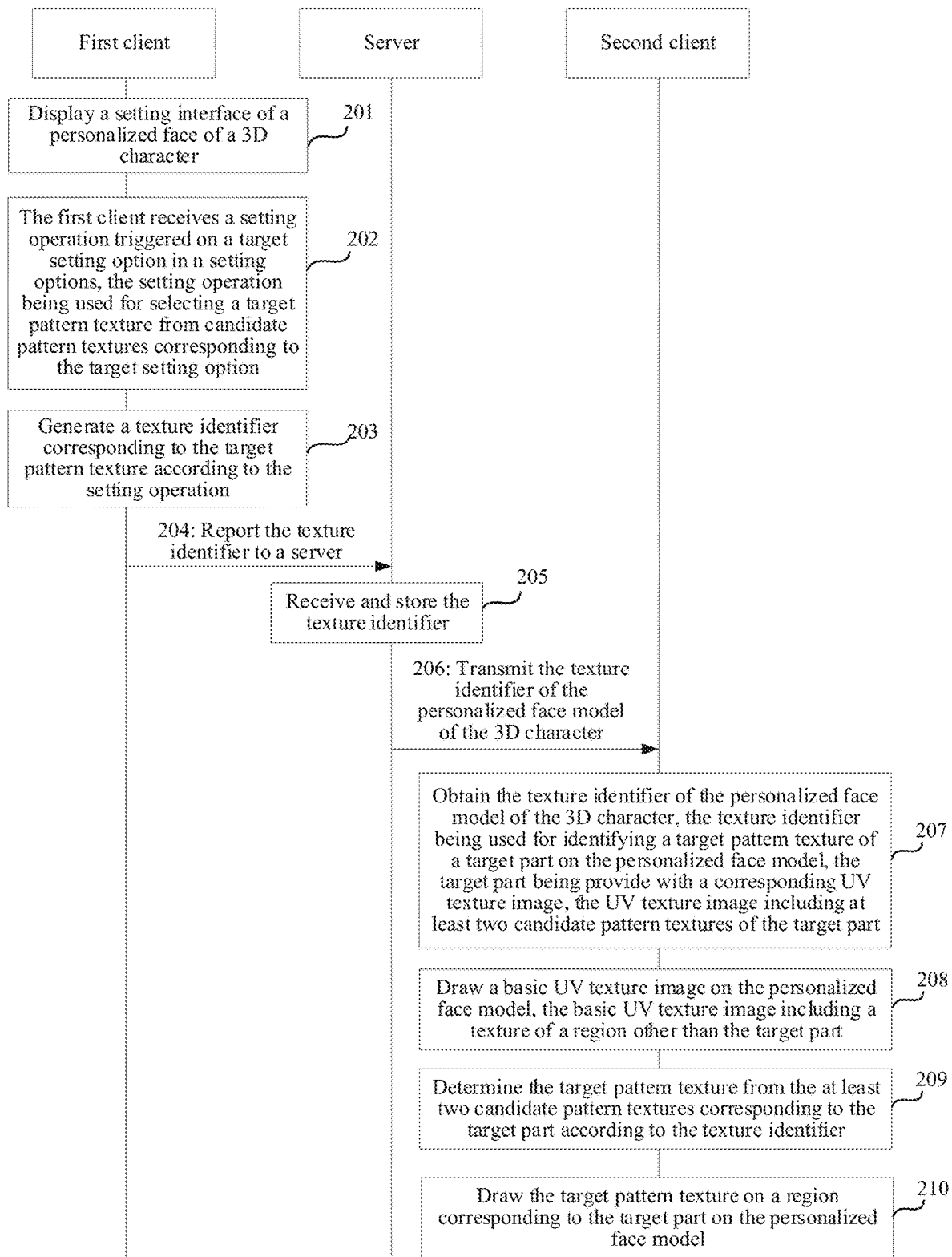
FIG. 3 is a flowchart of a method for displaying a personalized face of a 3D character according to another exemplary embodiment of this disclosure.

FIG. 3 is a flowchart of a method for displaying a personalized face of a 3D character according to an exemplary embodiment. The method includes the following steps:

Step 201: The first client displays a setting interface of a personalized face of a 3D character.

The setting interface includes a preview picture of a first face model and n setting options.

Figure 4:
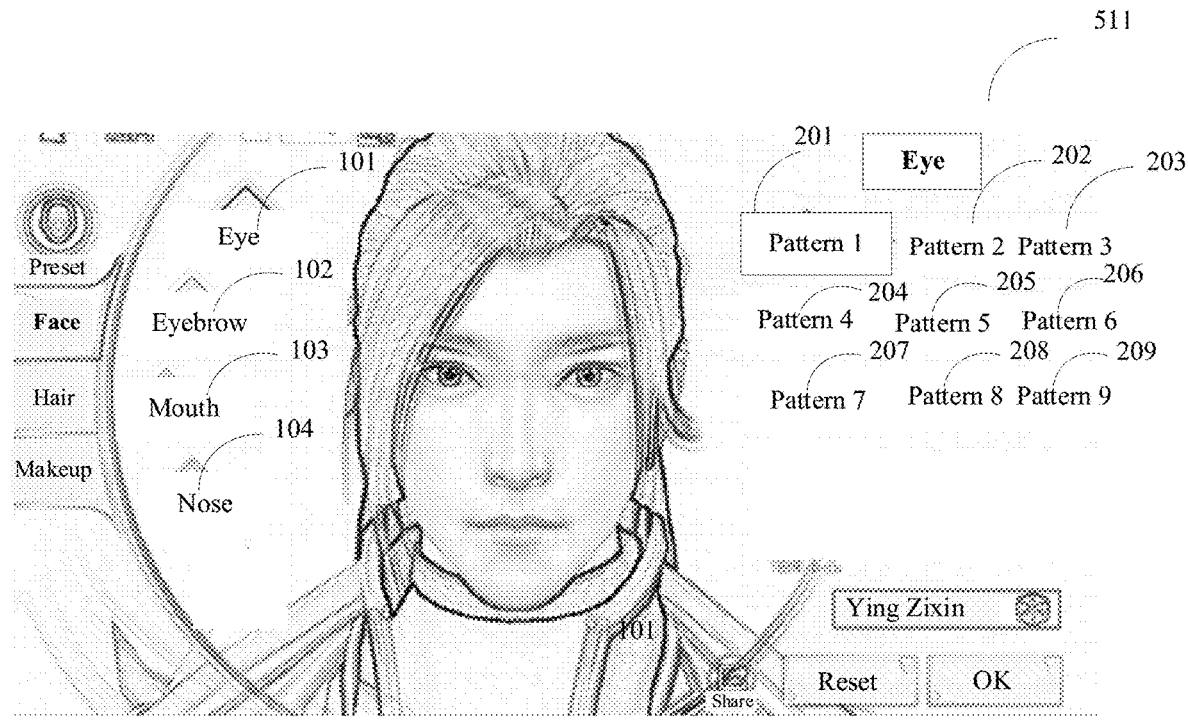
FIG. 4 is a schematic diagram of a terminal interface in a method for displaying a personalized face of a 3D character according to an exemplary embodiment of this disclosure.

Schematically, FIG. 4 is a diagram of a setting interface of a face of a 3D character X displayed on a first client in one of the embodiments of this disclosure. A picture of personalized customization and setting options of the 3D character X are displayed on the setting interface. The setting options include at least one of an eye setting option 101, an eyebrow setting option 102, a mouth setting option 103, or a nose setting option 104. Each setting option includes a plurality of candidate pattern textures for setting the setting option. For example, the eye setting option includes a plurality of candidate pattern textures: pattern 1, pattern 2, pattern 3, . . . , pattern 8, and pattern 9. The pattern 1 to the pattern 9 are shown in 201 to 209 in FIG. 4.

The personalized face model is implemented by modifying a corresponding local texture in at least one of the setting options.

Step 202: The first client receives a setting operation triggered on a target setting option in the n setting options, the setting operation being used for selecting a target pattern texture from candidate pattern textures corresponding to the target setting option.

Specifically, the first client may detect a setting operation performed on the target setting option in the n setting options, and determine a candidate pattern texture specifically selected by the setting operation of the corresponding target setting option. The selected candidate pattern texture is the target pattern texture. Further, the first client records a texture identifier corresponding to the target pattern texture in real time, and adjusts, according to the texture identifier in real time, a presented effect of the 3D character X on the setting interface.

Figure 5:
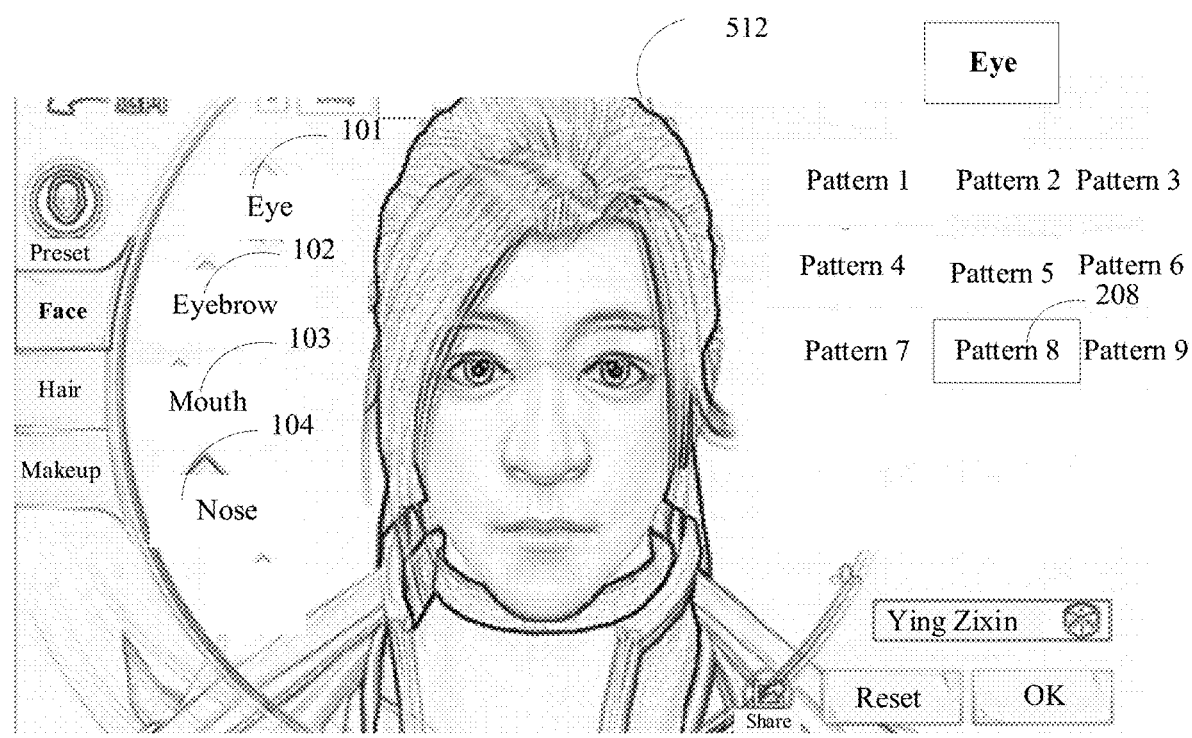
FIG. 5 is a schematic diagram of a terminal interface in a method for displaying a personalized face of a 3D character according to another exemplary embodiment of this disclosure.

FIG. 5 is a schematic diagram of an interface presented by the first client after the setting operation is received in this embodiment. The user selects the pattern 8 from the candidate pattern textures in the eye setting option 101, that is, a pattern marked by 208 in FIG. 5. Compared with an image state shown in FIG. 4 when the 3D character X is in an initial state, the eye region of the 3D character X after a setting of personalized customization changes significantly. That is, the eye region of the 3D character X changes to the selected target pattern texture.

In some embodiments, the setting operation received by the first client may be performed on at least one of the eye setting option 101, the eyebrow setting option 102, the mouth setting option 103, and the nose setting option 104. At least one candidate pattern texture is included in each setting option for the user to select.

Step 203: The first client generates a texture identifier corresponding to the target pattern texture according to the setting operation.

After completing the setting of the personalized face, the user triggers a determining option (or confirm option, by clicking the OK button). After receiving an operation of triggering the determining option, the first client generates the texture identifier according to face data of the current 3D character X. The texture identifier is used for identifying a target pattern texture of a target part in the first face model.

The target part is a part allowed to be modified through a personalized setting function. For example, the target part may include a part such as an eye, an eyebrow, or a mouth. The target pattern texture is various optional textures of a corresponding target part.

The target part may include any part of the 3D character, and therefore, the target part is not limited to the above.

Step 204: The first client reports the texture identifier to a server.

The texture identifier is a basis for a change in the personalized face model of the 3D character and is used for finding a corresponding target part and target pattern texture on a second client, so as to set an appearance of the 3D character in a personalized way.

Step 205: The server receives and stores the texture identifier.

After receiving the texture identifier of the first face model uploaded by the first client, the server stores the texture identifier in the server.

TABLE 1

| First client | Texture identifier of a first 3D character | Eye and pattern 8 Nose and pattern 2 |
|---|---|---|
| Second client | Texture identifier of a second 3D character | Eye and pattern 3 Mouth and pattern 5 |
| Third client | Texture identifier of a third 3D character | Eyebrow and pattern 7 |

Referring to table 1, the server stores a texture identifier of the 3D character X in at least one client and may transmit a texture identifier of any 3D character to any client. Optionally, when the 3D character X enters a field of view of a 3D character Y, the server transmits the texture identifier of the 3D character X to a client corresponding to (or displaying) the 3D character Y. Schematically, the server may simultaneously store texture identifiers of different target parts corresponding to a plurality of clients.

Step 206: The server transmits the texture identifier of the personalized face model of the 3D character to at least one of the first client and the second client.

Schematically, when the 3D character X enters a field of view of the second client, the server transmits the texture identifier of the 3D character X to the second client. Optionally, there may be one or more second clients.

When the first client corresponding to the 3D character X needs to display the 3D character X, the server transmits the texture identifier of the 3D character X to the first client. For example, when the 3D character X is within a field of view of the first client, or the user triggers a setting interface including an image of the 3D character on the first client, the server transmits the texture identifier of the 3D character X to the first client to enable the first client to find the corresponding target part and target pattern texture according to the texture identifier, and display a personalized face model after personalized customization. Therefore, the server may control the texture of the 3D character X by transmitting the texture identifier to a client when the 3D character X comes into a field of view of the client.

Descriptions are made below mainly by using an example in which the second client displays the personalized face model of the 3D character. For a process in which the first client displays the personalized face model of the 3D character, the principle is the same as or similar to that of the second client, and details are not repeated herein.

Step 207: The second client obtains the texture identifier of the personalized face model of the 3D character, the texture identifier being used for identifying a target pattern texture of a target part on the personalized face model, the target part being provided with a corresponding UV texture image, the UV texture image including at least two candidate pattern textures of the target part.

There are at least two candidate pattern textures of each target part on the personalized face model. After the user selects one of the at least two candidate pattern textures, a texture identifier having a one-to-one correspondence with the target pattern texture is generated. The second client can accurately find the corresponding target pattern texture after receiving the texture identifier.

Step 208: The second client draws a basic UV texture image on the personalized face model, the basic UV texture image including a texture of a region other than the target part. In some embodiments, the basic UV texture image may server as a foundation layer on top of which additional texture for a target part may be drawn.

The purpose of drawing the basic UV texture image on the personalized face model is to provide a texture for a non-target part on the personalized face model. During drawing of the basic UV texture image, the target part may be drawn according to a default texture, and the target part is replaced or overwritten or overlaid when the target part is subsequently drawn. Alternatively, only the region outside the target part may be drawn, and when the target part is subsequently drawn, the target pattern texture is added and drawn on the region in which the target part is located.

Step 209: The second client determines the target pattern texture from the at least two candidate pattern textures corresponding to the target part according to the texture identifier.

The texture identifier is used for identifying the target pattern texture of the target part on the personalized face model, and the texture identifier includes at least an identifier having a one-to-one correspondence with the target pattern texture.

Optionally, the identifier may include a specific coordinate range in a coordinate system in which the target pattern texture is located, or may be at least one of coordinate offset data and coordinate scaling data of each pixel in the coordinate system in which the target pattern texture is located.

Step 210: The second client draws the target pattern texture on a region corresponding to the target part on the personalized face model.

After determining the target parts according to the texture identifiers, the second client maps the target pattern textures to corresponding regions on the face model to obtain a personalized face.

Based on the above, according to the method provided by this embodiment, at least two candidate pattern textures are drawn for each target part in advance. After receiving the texture identifier, the second client determines the target pattern texture from a plurality of candidate pattern textures according to the texture identifier, and draws the target pattern texture on the target part on the personalized face model. The target part may also be identified by the texture identifier, A personalized face model is implemented through free combinations of the target textures without drawing all possible personalized face models according to the candidate pattern textures, which not only reduces the workload for an art designer to draw texture images and greatly reduces costs of implementing personalized customization of a face of a 3D model, but also avoids a problem of excessively large program package and excessively large memory and CPU usage of an application.

Figure 6:
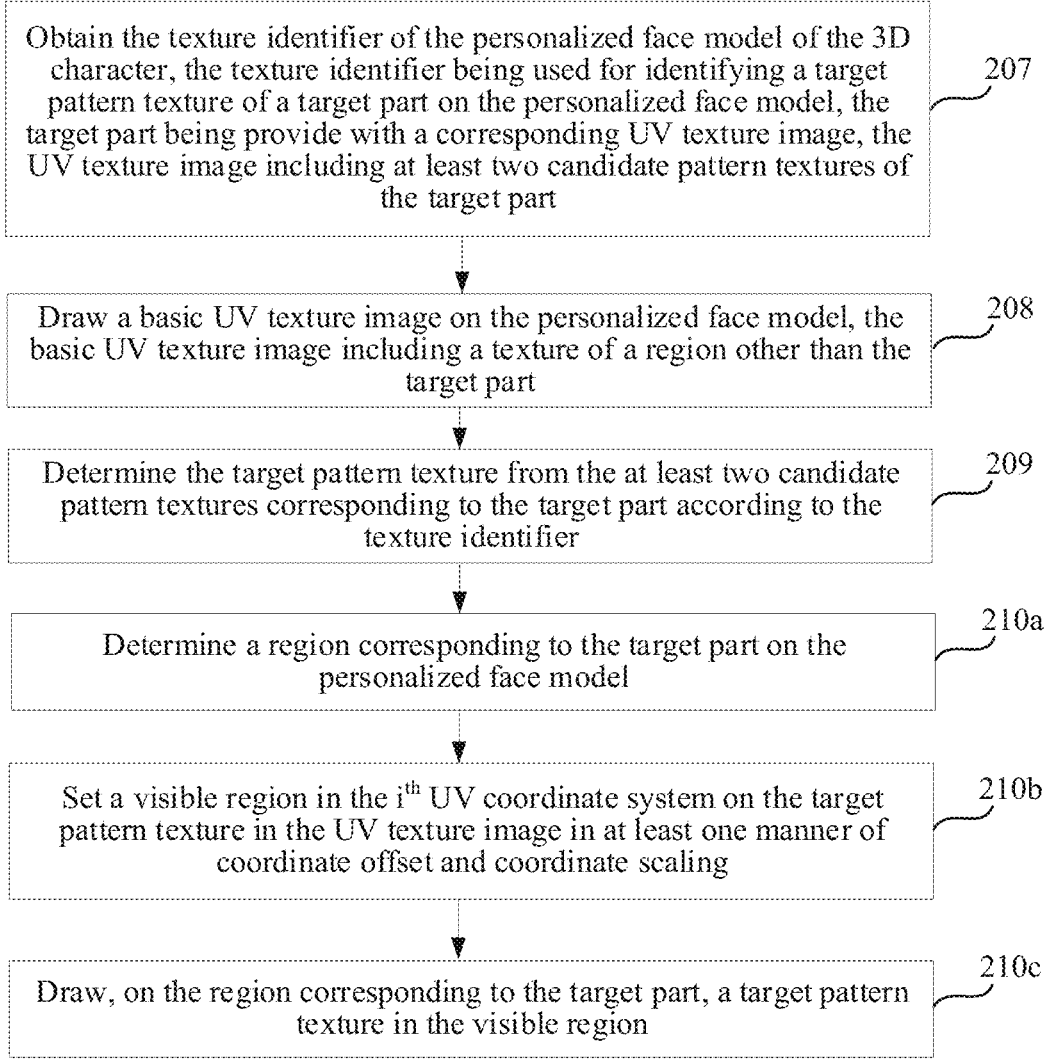
FIG. 6 is a flowchart of a method for displaying a personalized face of a 3D character according to another exemplary embodiment of this disclosure.

In some embodiments, the personalized face model includes n target parts, and a UV texture image corresponding to an $i^{th}$ target part is set in an $i^{th}$ UV coordinate system, where n is a positive integer greater than 1, and i is less than or equal to n. As shown in FIG. 6, step 210 may be replaced and implemented as the following steps:

Step 210a: The second client determines a region corresponding to the target part on the personalized face model.

The personalized face model includes n target parts, and a UV texture image corresponding to an $i^{th}$ target part is set in an $i^{th}$ UV coordinate system. The target pattern texture is drawn on the region corresponding to the target part on the personalized face model. For example, the personalized face model includes three target parts: an eye, a mouth, and an eyebrow. Each target part corresponds to a UV coordinate system, and all candidate pattern textures of the target part are drawn in the UV coordinate system corresponding to the target part.

The face model has a plurality of vertexes, and each vertex includes coordinate information. The coordinate information corresponds to positions in a plurality of coordinate systems. In some embodiments, when drawing the eye region, the second client acquires coordinate information of a coordinate system in which the target pattern texture of the eye in each vertex on the face model is located, and draws the target pattern texture on the target part.

Because the target pattern texture of each target part is drawn separately in a UV coordinate system, during drawing of the corresponding target pattern texture in the coordinate system, coordinate information of the vertexes in the UV coordinate system outside the target part may be set to negative numbers. In this case, the second client only needs to draw the target texture information on a region with positive coordinate information, to ensure that the target pattern texture is drawn on the target part.

Schematically, the second client obtains UV coordinates in the $i^{th}$ UV coordinate system that correspond to a vertex on the personalized face model, the UV coordinates including a U coordinate and a V coordinate, and determines a region in which a vertex with a U coordinate greater than or equal to 0 is located as the region corresponding to the target part, or determines a region in which a vertex with a V coordinate greater than or equal to 0 is located as the region corresponding to the target part. Because coordinate values that correspond to a vertex in the target region are set to positive numbers, the second client only needs to determine that a U coordinate or a V coordinate of the vertex is a positive number, to determine a region in which the vertex is located in the target part, thereby effectively reducing determining steps for the second client, and improving the performance of a device.

Figure 7:
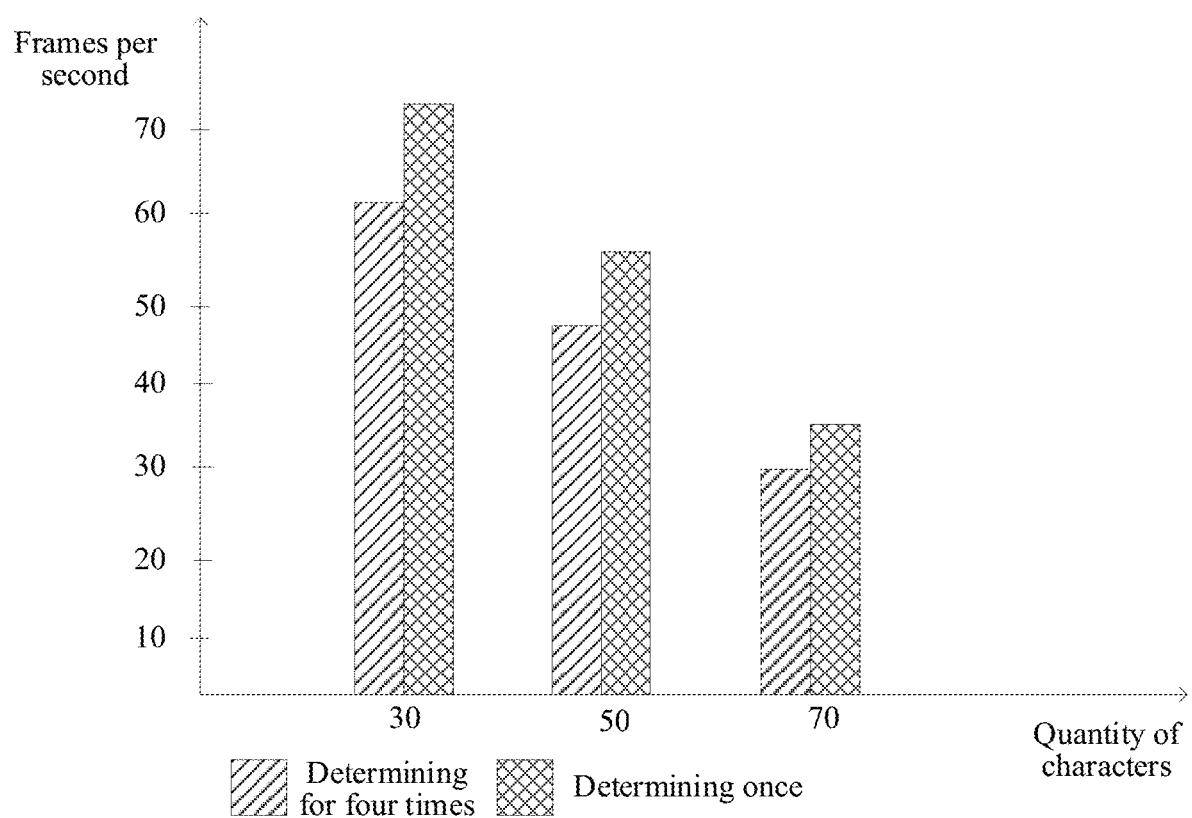
FIG. 7 is a comparison diagram of frames per second (FPS) in a method for displaying a personalized face of a 3D character according to an exemplary embodiment of this disclosure.

FIG. 7 is a schematic diagram of impact of a manner in which a client determines a coordinate range of a vertex on performance according to some embodiments of this disclosure. The horizontal ordinate in FIG. 7 represents a quantity of 3D characters, and the vertical ordinate represents Frame per Second (FPS). It can be learned with reference to FIG. 7 that, when the quantity of 3D characters is 30, the FPS on a device which determines a vertex coordinate once is over 70, and the FPS on a device which determines a vertex coordinate for four times is about 60; when the quantity of 3D characters is 50, the FPS on a device for determining a vertex coordinate once is about 70, and the FPS on a device for determining a vertex coordinate for four times is about 50; and when the quantity of 3D characters is 70, the FPS on a device for determining a vertex coordinate once is about 40, and the FPS on a device for determining a vertex coordinate for four times is about 30. It can be learned that, setting UV coordinates corresponding to a vertex of a non-target part to negative numbers allows the second client to determine, according to a negative/positive property of the UV coordinates, whether the vertex is in the target part, so that the FPS on a device can be effectively improved.

Step 210b: The second client sets a visible region in the $i^{th}$ UV coordinate system on the target pattern texture in the UV texture image in at least one of a coordinate offset manner and a coordinate scaling manner.

The second client sets a start position of the visible region in the $i^{th}$ UV coordinate system at a position of the target pattern texture in the manner of coordinate offset, and sets a region size of the visible region in the $i^{th}$ UV coordinate system to a size of the target pattern texture in the manner of coordinate scaling.

Optionally, the texture identifier includes at least one of coordinate offset data or coordinate scaling data. The visible region is included in a UV coordinate system in which the candidate pattern texture is located. The second client draws the texture in the visible region on the personalized face model. The coordinate offset data is used for changing the start position of the visible region, and the coordinate scaling data is used for changing the size of a visible range. After the visible range is determined according to the texture identifier, the second client maps a target pattern texture in the visible range to the target part to switch a local texture of the face model. For example, when the application is developed based on a Unity engine, the start position of the visible range may be modified by modifying a parameter corresponding to "offset", and the size of the visible range may be modified by modifying a parameter corresponding to "tiling". Because an effective range of UV coordinates is within a range enclosed by (0, 0), (1, 0), (1, 1), and (0, 1), when the second client samples each point in the UV coordinate system, according to at least one of coordinate offset data or coordinate scaling data in the texture, a final sampling range is determined in a region in which the target pattern texture is located.

Based on the above, a plurality of candidate pattern textures of the target part are drawn in a UV coordinate system, and ranges of different candidate pattern textures in the UV coordinate system are selected according to the texture identifier, thereby effectively reducing the workload for a technician to map the target pattern texture to the target part.

Step 210c: The second client draws, on the region corresponding to the target part, a target pattern texture in the visible region.

The second client obtains a coordinate mapping relationship, the coordinate mapping relationship including a mapping relationship between texture coordinates of the target pattern texture and a vertex of the target part; and draws, according to the coordinate mapping relationship, the target pattern texture in the visible region on the region corresponding to the target part on the personalized face model.

Based on the above, according to the method provided by this embodiment, candidate pattern textures of a plurality of target parts are drawn in different UV coordinate systems, and the second client maps the target pattern textures in different coordinate systems to the corresponding target regions on the face model one by one when drawing the personalized face, thereby effectively reducing the workload of an art designer and reducing occupied memory space of a device corresponding to the second client. In addition, the target region needs to be determined only once, which can effectively improve the performance of the device.

In some embodiments, a part such as a pupil of the 3D character is set on the basic UV texture image. With reference to the foregoing embodiment, because the basic UV texture image is set in the UV 1, when a shape is not changed but only a color of the pupil region is changed, there is no need to set a UV coordinate system for the pupil separately, but it only needs to identify an eyeball by using a single channel on the basic UV texture image. In this case, the second client changes pixel weight blending of the eyeball part, so that pupil color can be changed. Schematically, the channel may be selected from any one of r-channel, g-channel, and b-channel.

In the basic UV texture image, there is first position identification information of a first part in a designated color channel and the first part may include a pupil, the forehead, a cheek, or the like. After receiving the texture identifier, the second client obtains a color identifier of the first part from the basic UV texture image, determines a pixel corresponding to the first part according to the first position identification information in the designated color channel, and changes color of the pixel corresponding to the first part according to the color identifier to switch the color of the pupil.

The change of a local color of the basic UV texture image by using the b-channel may be implemented by using code in the following Table 2.

TABLE 2 fixed3 Mask =2D(_MaskTex, In.UV_MainTex).rgb
baseColor.rgb = _EyeBallColor*mask.b + baseColor.rgb Similarly, in the basic UV texture image, there is second position identification information of a second part exists in the designated color channel, and the second part may include a pupil, the forehead, a cheek, or the like. After obtaining a pattern identifier of the second part, the second client determines a pixel corresponding to the second part according to the second position identification information in the designated color channel, and changes color of the pixel corresponding to the second part according to color matching information corresponding to the pattern identifier, so as to complete pattern switching of the personalized face.

The change of the local color of the basic UV texture image may be implemented by using code in the following Table 3.

TABLE 3 fixed3 tattooColor = tex2D(_TattooTex,float2(IN.UV_MainTex.x/_TattooTexSize + _TattooTexUoffSet,IN.UV_MainTex.y/_TattooTexSize + _TattooTexVoffSett)).rgb;
baseColor.rgb = lerp(baseColor.rgb,_tattooColor,dot(tattooColor,_tattooColor));

Based on the above, in this embodiment, the pattern and color of the face are personalized by changing the local color of the basic UV texture image without adding an additional UV coordinate system, thereby reducing the load for the device corresponding to the second client.

Figure 8:
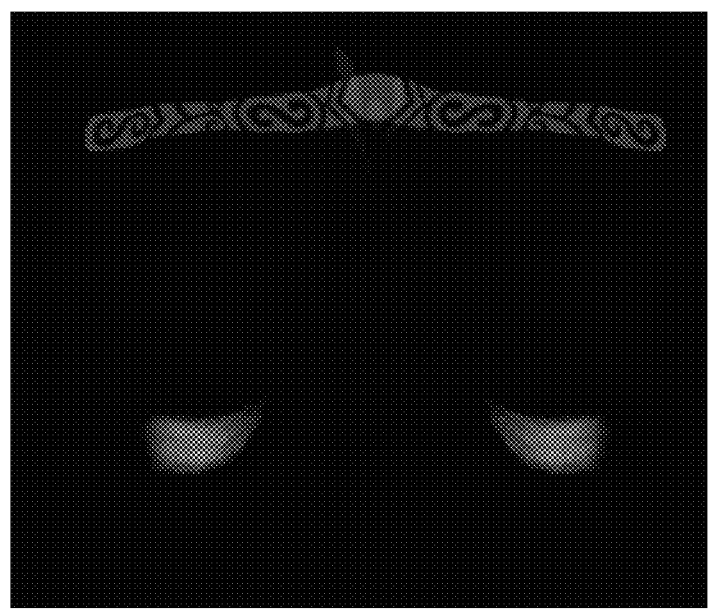
FIG. 8 is a schematic diagram of a personalized face pattern in a method for displaying a personalized face of a 3D character according to an exemplary embodiment of this disclosure.
Figure 9:
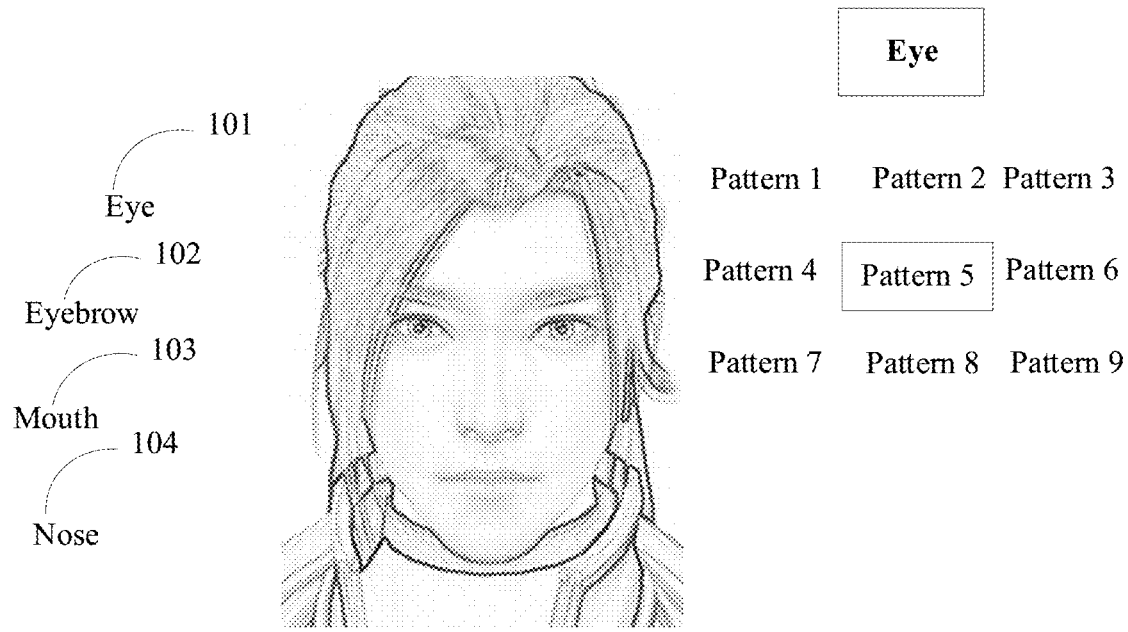
FIG. 9 is a schematic interface diagram of a method for displaying a personalized face of a 3D character according to another exemplary embodiment of this disclosure.
Figure 10:
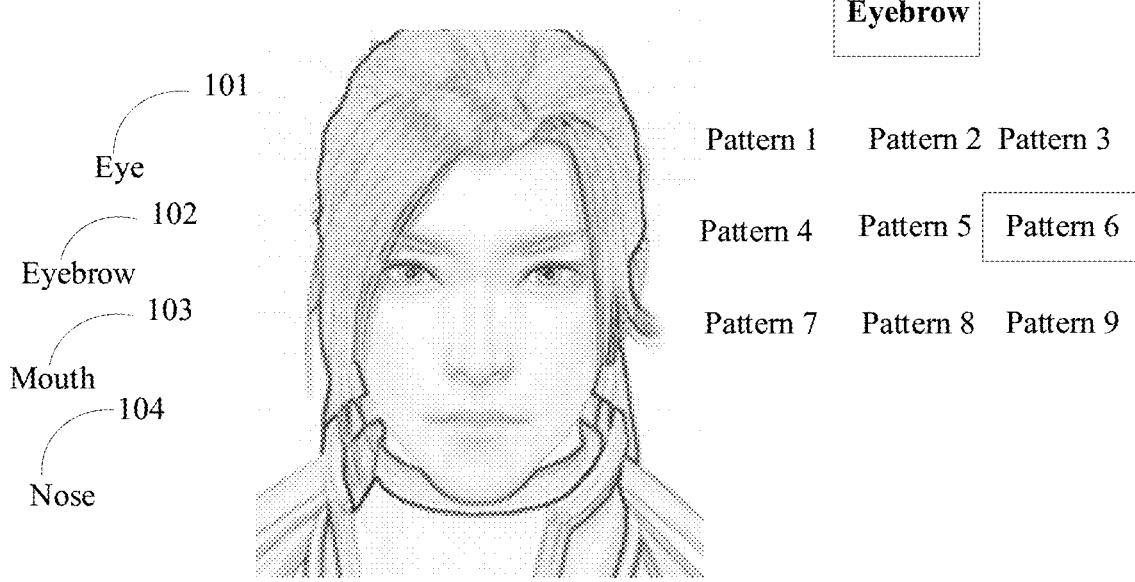
FIG. 10 is a schematic interface diagram of a method for displaying a personalized face of a 3D character according to another exemplary embodiment of this disclosure.
Figure 11:
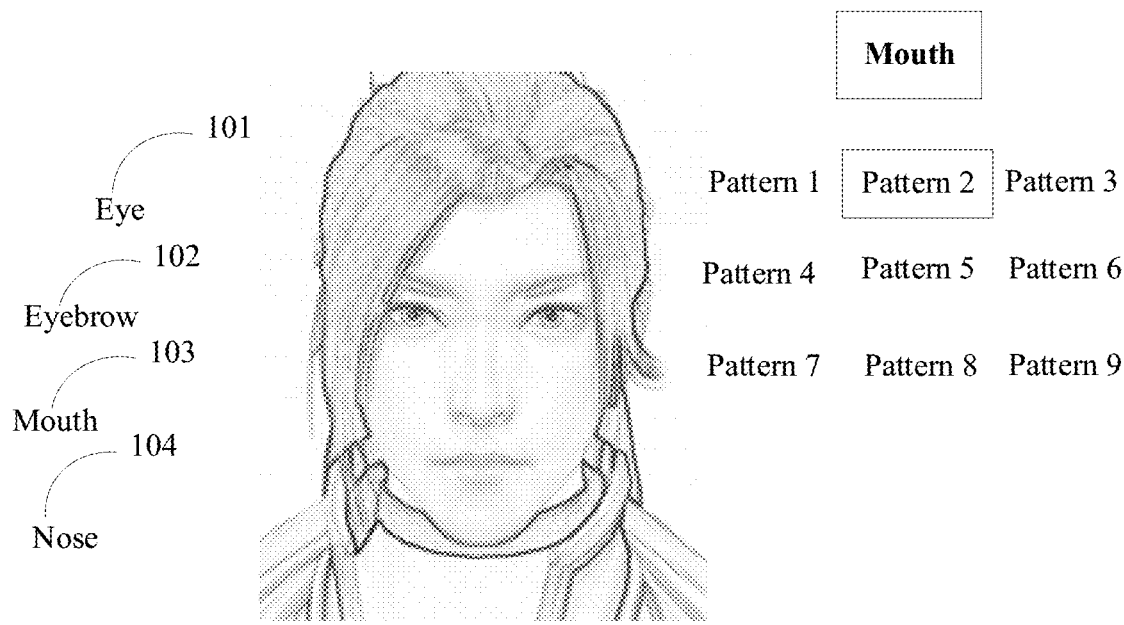
FIG. 11 is a schematic interface diagram of a method for displaying a personalized face of a 3D character according to another exemplary embodiment of this disclosure.

FIG. 8 is a pattern effect diagram generated by changing pixel weight blending of the eyeball part and the forehead part on the basic UV texture image. It can be seen from FIG. 8 that the colors of the forehead region and the eye region on the basic UV texture image are changed.

In some embodiments, because the left and right eyes of the 3D character are exactly the same, an art designer draws only one eye in a UV coordinate system corresponding to the target part of the eye, and draws the target pattern texture on a target part corresponding to the other eye in at least one manner of coordinate offset or coordinate scaling. In this way, switching between the two eyes can be completed. Similarly, only half of a target pattern texture of the mouth may be drawn, and the other half of the target pattern texture is drawn on the target part of the face model in at least one manner of coordinate offset and coordinate scaling. In this way, the workload of the art designer can be effectively reduced.

Figure 12:
FIG. 12 is a schematic interface diagram of a method for displaying a personalized face of a 3D character according to another exemplary embodiment of this disclosure.

An interface effect of the personalized face in the foregoing embodiment is described with reference to FIG. 4, and FIG. 9 to FIG. 12. FIG. 4 is a schematic interface diagram of an initial face of a 3D character in a setting interface. After the pattern 5 is selected from the eye option 101, the eye part of the 3D character is switched. The personalized face after the switching is in a state shown in FIG. 9. It can be seen that, other parts of the 3D character are not changed, and only the eye part is switched to the state of the pattern 5. A pattern texture is further selected from the eyebrow option 102. After the pattern 6 is selected, other parts of the 3D character are not changed, and only the eyebrow part is switched to the state of the pattern 6. It can be seen from FIG. 10 that a width of the eyebrow becomes narrower. A pattern texture is further selected for the mouth from the mouth option. After the pattern 2 is selected, other parts of the 3D character are not changed, and only the mouth part is switched to the state of the pattern 2. It can be seen from FIG. 11 that a beard is added for the mouth after the switching. A tattoo is further added for the 3D character. It can be seen from FIG. 12 that, a tattoo pattern is added for the forehead part of the character. Through the foregoing selections step by step, a finally displayed personalized face is shown in FIG. 12.

Figure 13:
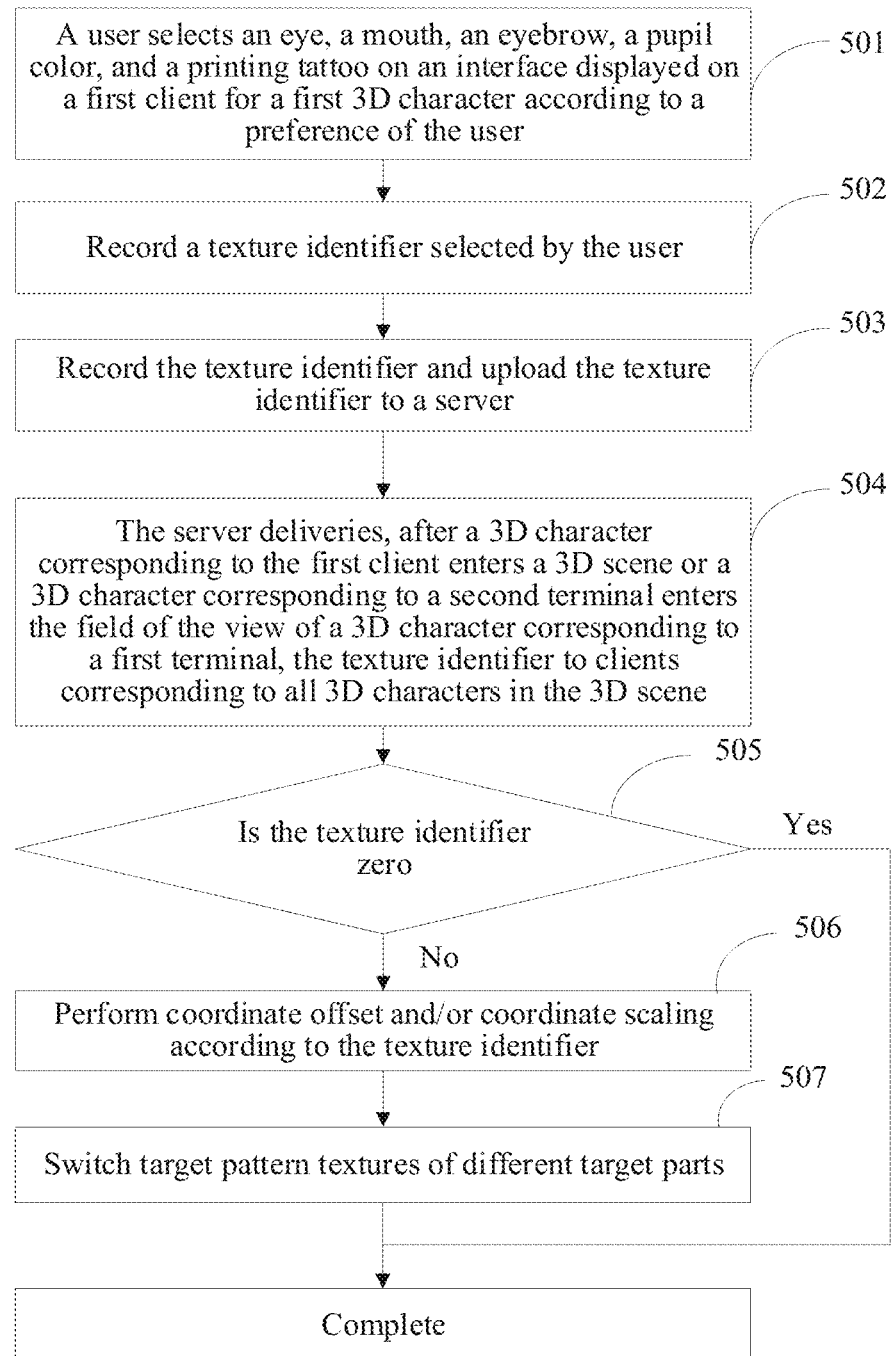
FIG. 13 is a flowchart of a method for displaying a personalized face of a 3D character according to another exemplary embodiment of this disclosure.

This solution is described with reference to FIG. 13. The method for displaying a personalized face of a customized 3D character includes the following steps:

Step 501: A user selects an eye, a mouth, an eyebrow, a pupil color, and a printing tattoo on an interface displayed on a first client for a first 3D character according to a preference of the user.

Step 502: The first client records a texture identifier selected by the user.

Step 503: The first client records the texture identifier and uploads the texture identifier to a server.

Step 504: The server deliveries, after a 3D character corresponding to the first client enters a 3D scene or a 3D character corresponding to a second terminal enters the field of the view of a 3D character corresponding to a first terminal, the texture identifier to clients corresponding to all 3D characters in the 3D scene. For example, a first 3D character corresponds to the first terminal and a second 3D character corresponds to the second terminal. The first 3D character may enter the field of the view of the second 3D character in the second terminal. The server may deliver the texture identifier to the first terminal and the second terminal, so the first terminal and the second terminal may display the corresponding texture of the 3D character.

Step 505: A second client determines whether the texture identifier is zero after receiving the texture identifier. If the texture identifier is zero, it indicates that the first client performs no personalized setting operation, or data of a first face model after the personalized setting operation remains the same compared with that of the first face model before the modification, and a personalized customization process of a face model ends.

If the texture identifier is not zero, it indicates that the first client performs a personalized setting operation on the first face model, and step 506 is performed.

Step 506: The second client performs coordinate offset and/or coordinate scaling according to the texture identifier.

Step 507: The second client switches target pattern textures of different target parts.

The implementation of the foregoing steps is the same as that of the foregoing embodiments, and reference may be made to the content of the foregoing embodiment. Details are not repeated in this embodiment.

TABLE 4

Fixde4 baseColor = tex2D(_MainTex, IN.UV_MainTex);
If(IN.UV2_EyeTex.x >=0)
{
   float u = IN.UV2_EyeTex.x / _EyeTexSizeX;
   float u = IN.UV2_EyeTex.y / _EyeTexSizeY;
   baseColor= tex2D(_EyeTex,float2(u + _EyeTexuoffset,
v + _EyeTexvoffset));
}
If(IN.UV3_MouthTex.x >=0)
{
   float u = IN.UV3_MouthTex.x / _MouthTexSizeX;
   float u = IN.UV3_MouthTex.y / _MouthTexSizeY;
   baseColor=tex3D(_MouthTex,float3(u + _MouthTexuoffset,
v + _MouthTexvoffset));
}
If(IN.UV4_EyeBrowTex.x >=0)
{
   float u = IN.UV4_EyeBrowTex.x / _EyeBrowTexSizeX;
   float u = IN.UV4_EyeBrowTex.y / _EyeBrowTexSizeY;
   baseColor=tex4D(_EyeBrowTex,float4(u + _EyeBrowTexuoffset,
v + _EyeBrowTexvoffset));
}

Table 4 shows a schematic program for the second client to generate a personalized face on the face model after receiving the texture identifier.

The method for displaying a personalized face of a 3D character provided by the embodiments of this disclosure may be applied to an application supporting display of a 3D virtual environment. The application is installed on a terminal, and the application supports display of a 3D virtual environment. The terminal may be a smartphone, a tablet computer, a personal computer, a portable computer, or the like. For example, the target application is a game program. This is not limited in the embodiments of this disclosure.

The method for displaying a personalized face of a 3D character provided by the embodiments of this disclosure is described below with reference to several schematic application scenarios.

1. Mobile Game Scenario

The method for displaying a personalized face of a 3D character provided by the embodiments of this disclosure may be implemented as a display module of an application. The application displays, on the display module according to a personalized customization operation performed by a user on a 3D character, the 3D character after the user personalized customization. The 3D character has a personalized face model after the personalized customization. Optionally, the 3D character after the personalized customization can display an expression animation.

2. 3D Online Game Scenario

In a 3D online game scenario, the method for displaying a personalized face of a 3D character provided by the embodiments of this disclosure may be implemented as a personalized customization module of a game program. The online game program generates a personalized face model after personalized customization according to a texture switching operation performed by a user on a 3D character. The 3D character after the personalized customization can display an expression animation.

Certainly, exemplary descriptions are made by using only the foregoing several possible application scenarios as examples. The method provided in the embodiments of this disclosure may further be applied to another application scenario that requires the display of a personalized face model of a 3D character, for example, a military simulation program, The Sims, an education simulation game, or a client game. A specific application scenario is not limited in the embodiments of this disclosure.

Figure 14:
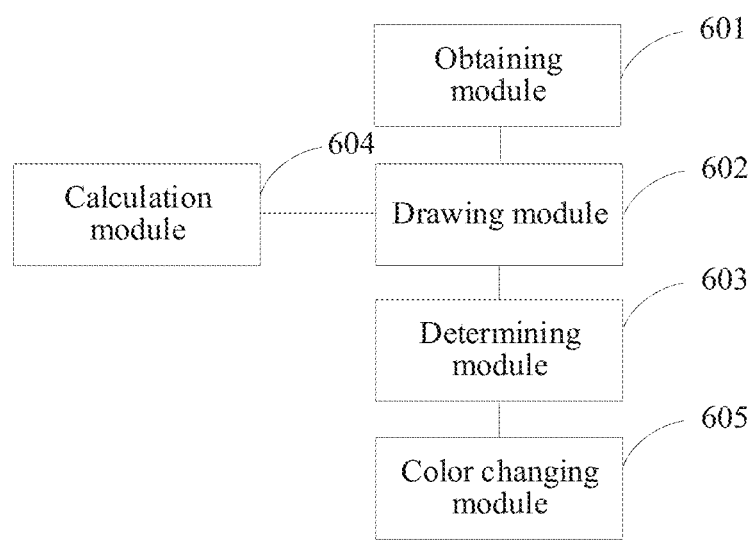
FIG. 14 is a block diagram of an apparatus for displaying a personalized face model of a 3D character according to an embodiment of this disclosure.

FIG. 14 is a block diagram of an apparatus for displaying a personalized face model of a 3D character according to an embodiment of this disclosure. The apparatus includes:

an obtaining module 601, configured to obtain a texture identifier of a personalized face model of a 3D character, the texture identifier being used for identifying a target pattern texture of a target part on the personalized face model, the target part being provided with a corresponding UV texture image, the UV texture image including at least two candidate pattern textures of the target part; a drawing module 602, configured to draw a basic UV texture image on the personalized face model, the basic UV texture image including a texture of a region other than the target part; and a determining module 603, configured to determine the target pattern texture from the at least two candidate pattern textures corresponding to the target part according to the texture identifier, the drawing module 602 being further configured to draw the target pattern texture on a region corresponding to the target part on the personalized face model.

In some embodiments, the personalized face model includes n target parts, and a UV texture image corresponding to an $i^{th}$ target part is set in an $i^{th}$ UV coordinate system, where n is a positive integer greater than 1, and i is less than or equal to n. The apparatus for displaying a personalized face of a 3D character further includes a calculation module 604. The determining module 603 is further configured to determine the region corresponding to the target part on the personalized face model. The calculation module 604 is configured to set a visible region in the $i^{th}$ UV coordinate system on the target pattern texture in the UV texture image in at least one manner of coordinate offset and coordinate scaling. The drawing module 602 is further configured to draw, on the region corresponding to the target part, a target pattern texture in the visible region.

In some embodiments, the determining module 603 is further configured to obtain UV coordinates in the $i^{th}$ UV coordinate system that correspond to a vertex on the personalized face model, the UV coordinates including a U coordinate and a V coordinate; and determine a region in which a vertex with a U coordinate greater than or equal to 0 is located as the region corresponding to the target part.

In some embodiments, the determining module 603 is further configured to obtain UV coordinates in the $i^{th}$ UV coordinate system that correspond to a vertex on the personalized face model, the UV coordinates including a U coordinate and a V coordinate; and determine a region in which a vertex with a V coordinate greater than or equal to 0 is located as the region corresponding to the target part.

In some embodiments, the calculation module 604 is further configured to set a start position of the visible region in the $i^{th}$ UV coordinate system at a position of the target pattern texture in the manner of coordinate offset; and the calculation module 604 is further configured to set a region size of the visible region in the $i^{th}$ UV coordinate system to a size of the target pattern texture in the manner of coordinate scaling.

In some embodiments, the drawing module 602 is further configured to obtain a coordinate mapping relationship, the coordinate mapping relationship including a mapping relationship between texture coordinates of the target pattern texture and a vertex of the target part; and draw the target pattern texture in the visible region on the region corresponding to the target part on the personalized face model according to the coordinate mapping relationship.

In some embodiments, in the basic UV texture image, there is first position identification information of a first part in a designated color channel. The apparatus for displaying a personalized face of a 3D character further includes a color changing module 605. The obtaining module 601 is further configured to obtain a color identifier of the first part. The determining module 603 is further configured to determine a pixel corresponding to the first part according to the first position identification information in the designated color channel. The color changing module 605 is configured to change color of the pixel corresponding to the first part according to the color identifier.

In some embodiments, in the basic UV texture image, there is second position identification information of a second part in a designated color channel. The obtaining module 601 is further configured to obtain a pattern identifier of the second part. The determining module 603 is further configured to determine a pixel corresponding to the second part according to the second position identification information in the designated color channel. The color changing module 605 is further configured to change color of the pixel corresponding to the second part according to color matching information corresponding to the pattern identifier.

In the apparatus for displaying a personalized face of a 3D character, at least two candidate pattern textures are drawn for each target part in advance. After receiving the texture identifier, the second client determines the target pattern texture from a plurality of candidate pattern textures according to the texture identifier, and draws the target pattern texture on the target part on the personalized face model. A personalized face model is implemented through free combinations of the target textures without drawing all possible personalized face models according to the candidate pattern textures, which not only reduces the workload for an art designer to draw texture images and greatly reduces costs of implementing personalized customization of a face of a 3D model, but also avoids a problem of excessively large program package and excessively large memory usage of an application.

Figure 15:
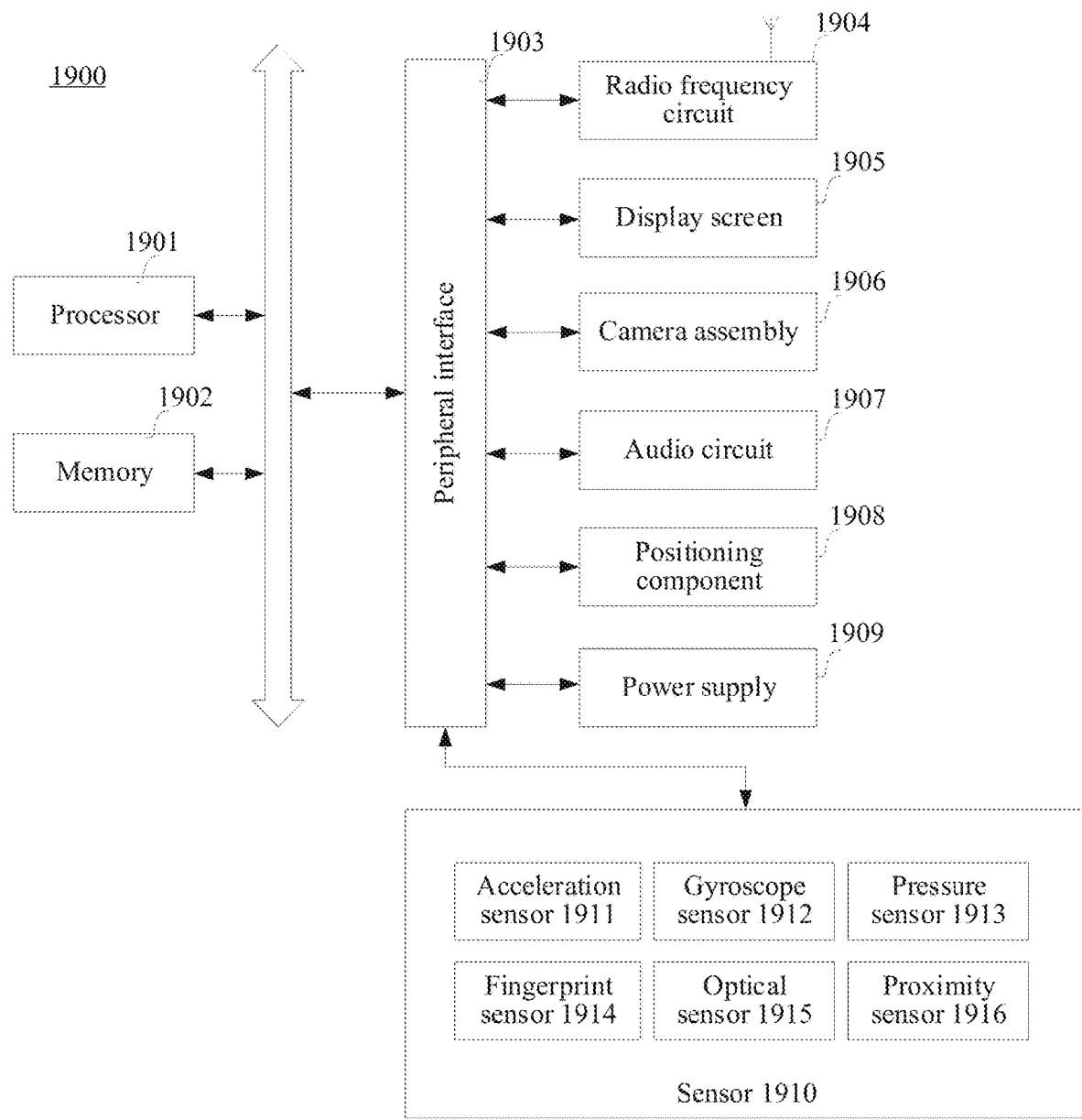
FIG. 15 is a structural block diagram of a server according to an exemplary embodiment of this disclosure.

FIG. 15 is a structural block diagram of a computer device according to an embodiment of this disclosure. The computer device may be specifically a terminal 1900. The terminal may be specifically a smartphone, a tablet computer, a Moving Picture Experts Group Audio Layer III (MP3) player, a Moving Picture Experts Group Audio Layer IV (MP4) player, a notebook computer, or a desktop computer. The terminal 1900 may also be referred to as another name such as user equipment, a portable terminal, a laptop terminal, or a desktop terminal.

Generally, the terminal 1900 includes a processor 1901 and a memory 1902.

The processor 1901 may include one or more processing cores, and may be, for example, a 4-core processor or an 8-core processor. The processor 1901 may be implemented in at least one hardware form of a digital signal processor (DSP), a field-programmable gate array (FPGA), or a programmable logic array (PLA). The processor 1901 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1901 may be integrated with a graphics processing unit (GPU). The GPU is configured to render and draw content that needs to be displayed on a display. In some embodiments, the processor 1901 may further include an artificial intelligence (AI) processor. The AI processor is configured to process computing operations related to machine learning.

The memory 1902 may include one or more computer-readable storage media. The non-transitory computer-readable storage medium may be non-transient. The memory 1902 may further include a high-speed random access memory, and a non-volatile memory such as one or more magnetic disk storage devices and a flash memory device. In some embodiments, the non-transitory computer-readable storage medium in the memory 1902 is configured to store at least one instruction, the at least one instruction being configured to be executed by the processor 1901 to implement the method for displaying a personalized face of a 3D character provided in the method embodiments of this disclosure.

In some embodiments, the terminal 1900 may optionally include a peripheral interface 1903 and at least one peripheral. The processor 1901, the memory 1902, and the peripheral interface 1903 may be connected by a bus or a signal line. Each peripheral may be connected to the peripheral interface 1903 by using a bus, a signal cable, or a circuit board. Specifically, the peripheral includes at least one of a radio frequency (RF) circuit 1904, a display screen 1905, a camera assembly 1906, an audio circuit 1907, a positioning component 1908, and a power supply 1909.

The peripheral interface 1903 may be configured to connect the at least one peripheral related to input/output (I/O) to the processor 1901 and the memory 1902. In some embodiments, the processor 1901, the memory 1902, and the peripheral interface 1903 are integrated on the same chip or circuit board. In some other embodiments, any one or two of the processors 1901, the memory 1902, and the peripheral interface 1903 may be implemented on a separate chip or circuit board. This is not limited in this embodiment.

The RF circuit 1904 is configured to receive and transmit an RF signal, also referred to as an electromagnetic signal. The RF circuit 1904 communicates with a communication network and another communication device by using the electromagnetic signal. The RF circuit 1904 converts an electric signal into an electromagnetic signal for transmission, or converts a received electromagnetic signal into an electric signal. Optionally, the RF circuit 1904 includes: an antenna system, an RF transceiver, one or more amplifiers, a tuner, an oscillator, a digital signal processor, a codec chip set, a subscriber identity module card, and the like. The RF circuit 1904 may communicate with other terminals by using at least one wireless communication protocol. The wireless communication protocol includes, but is not limited to at least one of a world wide web, a metropolitan area network, an intranet, generations of mobile communication networks (2G, 3G, 4G, and 5G), a wireless local area network, and a wireless fidelity (Wi-Fi) network. In some embodiments, the RF circuit 1904 may further include a circuit related to NFC, which is not limited in this application.

The display screen 1905 is configured to display a user interface (UI). The UI may include a graph, text, an icon, a video, and any combination thereof. When the display screen 1905 is a touch display screen, the display screen 1905 is also capable of acquiring a touch signal on or above a surface of the display screen 1905. The touch signal may be inputted into the processor 1901 as a control signal for processing. In this case, the display screen 1905 may be further configured to provide a virtual button and/or a virtual keyboard, which is also referred to as a soft button and/or a soft keyboard. In some embodiments, there may be one display screen 1905 disposed on a front panel of the terminal 1900. In some other embodiments, there may be at least two display screens 1905 respectively disposed on different surfaces of the terminal 1900 or designed in a foldable shape. In still some other embodiments, the display screen 1905 may be a flexible display screen disposed on a curved surface or a folded surface of the terminal 1900. The display screen 1905 may further be set to have a non-rectangular irregular graph, that is, a special-shaped screen. The display screen 1905 may be prepared by using materials such as a liquid crystal display (LCD), an organic light-emitting diode (OLED), or the like.

The camera assembly 1906 is configured to acquire an image or a video. Optionally, the camera assembly 1906 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera assembly 1906 may further include a flash. The flash may be a single color temperature flash or a double color temperature flash. The double color temperature flash refers to a combination of a warm light flash and a cold light flash, and may be used for light compensation under different color temperatures.

The audio circuit 1907 may include a microphone and a speaker. The microphone is configured to acquire sound waves of users and surroundings, and convert the sound waves into electrical signals and input the signals to the processor 1901 for processing, or input the signals to the radio frequency circuit 1904 to implement voice communication. For a purpose of stereo acquisition or noise reduction, there may be a plurality of microphones disposed at different portions of the terminal 1900 respectively. The microphone may alternatively be a microphone array or an omnidirectional acquisition microphone. The speaker is configured to convert electrical signals from the processor 1901 or the RF circuit 1904 into sound waves. The speaker may be a conventional thin-film speaker or a piezoelectric ceramic speaker. When the speaker is the piezoelectric ceramic speaker, electrical signals not only can be converted into sound waves that can be heard by human, but also can be converted into sound waves that cannot be heard by human for ranging and the like. In some embodiments, the audio circuit 1907 may also include an earphone jack.

The positioning component 1908 is configured to position a current geographic position of the terminal 1900, to implement navigation or a location based service (LBS). The positioning component 1908 may be a positioning component based on the global positioning system (GPS) of the United States, the BeiDou System of China, and the GALILEO System of Russia.

The power supply 1909 is configured to supply power to components in the terminal 1900. The power supply 1909 may be an alternating current, a direct current, a primary battery, or a rechargeable battery. When the power supply 1909 includes a rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charge technology.

In some embodiments, the terminal 1900 may also include one or more sensors 1910. The one or more sensors 1910 include, but are not limited to, an acceleration sensor 1911, a gyroscope sensor 1912, a pressure sensor 1913, a fingerprint sensor 1914, an optical sensor 1915, and a proximity sensor 1916.

The acceleration sensor 1911 may detect a magnitude of acceleration on three coordinate axes of a coordinate system established with the terminal 1900. For example, the acceleration sensor 1911 may be configured to detect components of gravity acceleration on the three coordinate axes. The processor 1901 may control, according to a gravity acceleration signal acquired by the acceleration sensor 1911, the display screen 1905 to display the user interface in a frame view or a portrait view. The acceleration sensor 1911 may be further configured to acquire motion data of a game or a user.

The gyroscope sensor 1912 may detect a body direction and a rotation angle of the terminal 1900. The gyroscope sensor 1912 may cooperate with the acceleration sensor 1911 to acquire a 3D action by the user on the terminal 1900. The processor 1901 may implement the following functions according to the data acquired by the gyroscope sensor 1912: motion sensing (such as changing the UI according to a tilt operation of the user), image stabilization at shooting, game control, and inertial navigation.

The pressure sensor 1913 may be disposed on at least one of a side frame of the terminal 1900 or a lower layer of the display screen 1905. When the pressure sensor 1913 is disposed on the side frame of the terminal 1900, a holding signal of the user on the terminal 1900 may be detected. The processor 1901 performs left and right hand recognition or a quick operation according to the holding signal acquired by the pressure sensor 1913. When the pressure sensor 1913 is disposed on the lower layer of the touch display screen 1905, the processor 1901 controls, according to a pressure operation of the user on the display screen 1905, an operable control on the UI. The operable control includes at least one of a button control, a scroll bar control, an icon control, and a menu control.

The fingerprint sensor 1914 is configured to acquire a fingerprint of a user, and the processor 1901 identifies an identity of the user according to the fingerprint acquired by the fingerprint sensor 1914, or the fingerprint sensor 1914 identifies the identity of the user based on the acquired fingerprint. When the identity of the user is identified as a trusted identity, the processor 1901 authorizes the user to perform a related sensitive operation. The sensitive operation includes unlocking a screen, viewing encrypted information, downloading software, payment, changing settings, and the like. The fingerprint sensor 1914 may be disposed on a front face, a back face, or a side face of the terminal 1900. When a physical button or a vendor logo is disposed on the terminal 1900, the fingerprint sensor 1914 may be integrated with the physical button or the vendor logo.

The optical sensor 1915 is configured to acquire ambient light intensity. In an embodiment, the processor 1901 may control display brightness of the display screen 1905 according to the ambient light intensity acquired by the optical sensor 1915. Specifically, when the ambient light intensity is relatively high, the display brightness of the display screen 1905 is increased. When the ambient light intensity is relatively low, the display brightness of the display screen 1905 is reduced. In another embodiment, the processor 1901 may further dynamically adjust a camera parameter of the camera assembly 1906 according to the ambient light intensity acquired by the optical sensor 1915.

The proximity sensor 1916, also referred to as a distance sensor, is generally disposed on the front panel of the terminal 1900. The proximity sensor 1916 is configured to acquire a distance between the user and the front surface of the terminal 1900. In an embodiment, when the proximity sensor 1916 detects that the distance between the user and the front surface of the terminal 1900 gradually becomes smaller, the display screen 1905 is controlled by the processor 1901 to switch from a screen-on state to a screen-off state. In a case that the proximity sensor 1916 detects that the distance between the user and the front surface of the terminal 1900 gradually becomes larger, the display screen 1905 is controlled by the processor 1901 to switch from the screen-off state to the screen-on state.

A person skilled in the art may understand that the structure shown in FIG. 15 constitutes no limitation on the terminal 1900, and the terminal may include more or fewer components than those shown in the figure, or some components may be combined, or a different component deployment may be used.

An embodiment of this disclosure further provides a computer device. The computer device includes a processor and a memory, the memory storing a computer-readable instruction, the computer-readable instruction being loaded and executed by the processor to implement the steps of the foregoing method for displaying a personalized face of a 3D character.

An embodiment of this disclosure further provides a non-transitory computer-readable storage medium. The non-transitory computer-readable storage medium stores computer-readable instructions, the computer-readable instructions being loaded and executed by a processor to implement the steps of the foregoing method for displaying a personalized face of a 3D character.

An embodiment of this disclosure further provides a computer program product, storing computer-readable instructions, the computer-readable instructions being loaded and executed by a processor to implement the steps of the foregoing method for displaying a personalized face of a 3D character.

Other embodiments of this disclosure can be readily figured out by a person skilled in the art upon consideration of the specification and practice of the disclosure here. This application is intended to cover any variations, uses or adaptive changes of this application. Such variations, uses or adaptive changes follow the general principles of this application, and include well-known knowledge and conventional technical means in the art that are not disclosed in this application.

This application is not limited to the accurate structures that are described above and that are shown in the accompanying drawings, and modifications and changes may be made without departing from the scope of this application. The scope of this application is limited by the appended claims only.

"A plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely preferred embodiments of this disclosure, but are not intended to limit this application. Any modification, equivalent replacement, or improvement made within the spirit and principle of this application shall fall within the protection scope of this application.

What is claimed is:

1. A method for displaying a personalized face of a three-dimensional (3D) character, performed by a computer device, the method comprising:
   obtaining a texture identifier of a personalized face model of a 3D character, the texture identifier being used for identifying a target pattern texture of a target part on the personalized face model, the target part being configured with a corresponding UV texture image, the UV texture image comprising at least two candidate pattern textures of the target part;
   obtaining first position identification information for a first part in a basic UV texture image, wherein:
     the basic UV texture image comprises a texture of a region other than the target part;
     the first position identification information identifies position information of the first part in the basic UV texture image;
     the target part comprises at least an eye;
     the first part comprises at least a pupil; and
     the first part is a component of the target part and fits into the target part on the personalized face model;
   obtaining a color identifier of the first part;
   determining a pixel corresponding to the first part according to the first position identification information;
   updating the basic UV texture image by changing color of the pixel corresponding to the first part according to the color identifier;
   drawing the basic UV texture image on the personalized face model;
   determining, according to the texture identifier, the target pattern texture from the at least two candidate pattern textures of the target part; and
   drawing the target pattern texture on a region corresponding to the target part on the personalized face model.

2. The method according to claim 1, wherein:
   the personalized face model comprises n target parts, the UV texture image corresponding to an $i^{th}$ target part is set in an $i^{th}$ UV coordinate system, n is a positive integer greater than 1, and i is less than or equal to n; and
   drawing the target pattern texture on the region corresponding to the target part on the personalized face model comprises:
     determining the region corresponding to the target part on the personalized face model;
     setting a visible region in the $i^{th}$ UV coordinate system on the target pattern texture in the UV texture image using at least one a coordinate offset manner or a coordinate scaling manner; and
     drawing the target pattern texture in the visible region of the region corresponding to the target part.

3. The method according to claim 2, wherein determining the region corresponding to the target part on the personalized face model comprises:
   obtaining UV coordinates in the $i^{th}$ UV coordinate system that correspond to a vertex on the personalized face model, the UV coordinates comprising a U coordinate and a V coordinate; and
   determining a region in which a vertex with a U coordinate greater than or equal to 0 is located as the region corresponding to the target part.

4. The method according to claim 2, wherein determining the region corresponding to the target part on the personalized face model comprises:
   obtaining UV coordinates in the $i^{th}$ UV coordinate system that correspond to a vertex on the personalized face model, the UV coordinates comprising a U coordinate and a V coordinate; and
   determining a region in which a vertex with a V coordinate greater than or equal to 0 is located as the region corresponding to the target part.

5. The method according to claim 2, wherein setting the visible region in the $i^{th}$ UV coordinate system on the target pattern texture in the UV texture image using the at least one of the coordinate offset manner or the coordinate scaling manner comprises at least one of:
   setting a start position of the visible region in the $i^{th}$ UV coordinate system at a position of the target pattern texture in the coordinate offset manner; or
   setting a region size of the visible region in the $i^{th}$ UV coordinate system to a size of the target pattern texture in the coordinate scaling manner.

6. The method according to claim 2, wherein drawing the target pattern texture in the visible region of the region corresponding to the target part comprises:
   obtaining a coordinate mapping relationship, the coordinate mapping relationship comprising a mapping relationship between texture coordinates of the target pattern texture and a vertex of the target part; and
   drawing the target pattern texture in the visible region of the region corresponding to the target part on the personalized face model according to the coordinate mapping relationship.

7. The method according to claim 1, wherein:
   second position identification information of a second part exists in a designated color channel in the basic UV texture image; and
   the method further comprises:
     obtaining a pattern identifier of the second part;
     determining a pixel corresponding to the second part according to the second position identification information in the designated color channel; and
     changing color of the pixel corresponding to the second part according to color matching information corresponding to the pattern identifier.

8. A device for displaying a personalized face of a three-dimensional (3D) character, comprising a memory for storing computer instructions and a processor in communication with the memory, wherein, when the processor executes the computer instructions, the processor is configured to cause the device to:

obtain a texture identifier of a personalized face model of a 3D character, the texture identifier being used for identifying a target pattern texture of a target part on the personalized face model, the target part being configured with a corresponding UV texture image, the UV texture image comprising at least two candidate pattern textures of the target part;

obtain first position identification information for a first part in a basic UV texture image, wherein:
the basic UV texture image comprises a texture of a region other than the target part;
the first position identification information identifies position information of the first part in the basic UV texture image;
the target part comprises at least an eye;
the first part comprises at least a pupil; and
the first part is a component of the target part and fits into the target part on the personalized face model;

obtain a color identifier of the first part;
determine a pixel corresponding to the first part according to the first position identification information;
update the basic UV texture image by changing color of the pixel corresponding to the first part according to the color identifier;
draw the basic UV texture image on the personalized face model;
determine, according to the texture identifier, the target pattern texture from the at least two candidate pattern textures of the target part; and
draw the target pattern texture on a region corresponding to the target part on the personalized face model.

9. The device according to claim 8, wherein:
the personalized face model comprises n target parts, the UV texture image corresponding to an $i^{th}$ target part is set in an $i^{th}$ UV coordinate system, and i is less than or equal to n; and
when the processor is configured to cause the device to draw the target pattern texture on the region corresponding to the target part on the personalized face model, the processor is configured to cause the device to:
determine the region corresponding to the target part on the personalized face model;
set a visible region in the $i^{th}$ UV coordinate system on the target pattern texture in the UV texture image using at least one a coordinate offset manner or a coordinate scaling manner; and
draw the target pattern texture in the visible region of the region corresponding to the target part.

10. The device according to claim 9, wherein, when the processor is configured to cause the device to determine the region corresponding to the target part on the personalized face model, the processor is configured to cause the device to:
obtain UV coordinates in the $i^{th}$ UV coordinate system that correspond to a vertex on the personalized face model, the UV coordinates comprising a U coordinate and a V coordinate; and
determine a region in which a vertex with a U coordinate greater than or equal to 0 is located as the region corresponding to the target part.

11. The device according to claim 9, wherein, when the processor is configured to cause the device to determine the region corresponding to the target part on the personalized face model, the processor is configured to cause the device to:
obtain UV coordinates in the $i^{th}$ UV coordinate system that correspond to a vertex on the personalized face model, the UV coordinates comprising a U coordinate and a V coordinate; and
determine a region in which a vertex with a V coordinate greater than or equal to 0 is located as the region corresponding to the target part.

12. The device according to claim 9, wherein, when the processor is configured to cause the device to set the visible region in the $i^{th}$ UV coordinate system on the target pattern texture in the UV texture image using the at least one of the coordinate offset manner or the coordinate scaling manner, the processor is configured to cause the device to perform at least one of:
set a start position of the visible region in the $i^{th}$ UV coordinate system at a position of the target pattern texture in the coordinate offset manner; or
set a region size of the visible region in the $i^{th}$ UV coordinate system to a size of the target pattern texture in the coordinate scaling manner.

13. The device according to claim 9, wherein, when the processor is configured to cause the device to draw the target pattern texture in the visible region of the region corresponding to the target part, the processor is configured to cause the device to:
obtain a coordinate mapping relationship, the coordinate mapping relationship comprising a mapping relationship between texture coordinates of the target pattern texture and a vertex of the target part; and
draw the target pattern texture in the visible region of the region corresponding to the target part on the personalized face model according to the coordinate mapping relationship.

14. The device according to claim 8, wherein:
second position identification information of a second part exists in a designated color channel in the basic UV texture image; and
when the processor executes the computer instructions, the processor is configured to further cause the device to:
obtain a pattern identifier of the second part;
determine a pixel corresponding to the second part according to the second position identification information in the designated color channel; and
change color of the pixel corresponding to the second part according to color matching information corresponding to the pattern identifier.

15. A non-transitory storage medium for storing computer readable instructions, the computer readable instructions, when executed by a processor in a device comprising a camera, causing the processor to:
obtain a texture identifier of a personalized face model of a 3D character, the texture identifier being used for identifying a target pattern texture of a target part on the personalized face model, the target part being configured with a corresponding UV texture image, the UV texture image comprising at least two candidate pattern textures of the target part;
obtain first position identification information for a first part in a basic UV texture image, wherein:
the basic UV texture image comprises a texture of a region other than the target part;

the first position identification information identifies position information of the first part in the basic UV texture image;

the target part comprises at least an eye;

the first part comprises at least a pupil; and the first part is a component of the target part and fits into the target part on the personalized face model;

obtain a color identifier of the first part;

determine a pixel corresponding to the first part according to the first position identification information;

update the basic UV texture image by changing color of the pixel corresponding to the first part according to the color identifier;

draw the basic UV texture image on the personalized face model;

determine, according to the texture identifier, the target pattern texture from the at least two candidate pattern textures of the target part; and draw the target pattern texture on a region corresponding to the target part on the personalized face model.

16. The non-transitory storage medium according to claim 15, wherein:

the personalized face model comprises n target parts, the UV texture image corresponding to an $i^{th}$ target part is set in an $i^{th}$ UV coordinate system, and i is less than or equal to n; and when the computer readable instructions cause the processor to draw the target pattern texture on the region corresponding to the target part on the personalized face model, the computer readable instructions cause the processor to:

determine the region corresponding to the target part on the personalized face model;

set a visible region in the $i^{th}$ UV coordinate system on the target pattern texture in the UV texture image using at least one a coordinate offset manner or a coordinate scaling manner; and draw the target pattern texture in the visible region of the region corresponding to the target part.

* * * * *